United States Patent [19]
Gray et al.

[11] Patent Number: 4,794,535
[45] Date of Patent: Dec. 27, 1988

[54] METHOD FOR DETERMINING ECONOMIC DRILL BIT UTILIZATION

[75] Inventors: Richard L. Gray, Austin, Tex.; Vivien J. Cambridge, Baton Rouge, La.

[73] Assignee: Automated Decisions, Inc., Austin, Tex.

[21] Appl. No.: 897,766

[22] Filed: Aug. 18, 1986

[51] Int. Cl.$^4$ ............................................. G06F 15/20
[52] U.S. Cl. ...................................... 364/420; 73/151; 73/151.5
[58] Field of Search ............... 364/420; 73/150, 151.5; 175/39, 40, 45

[56] References Cited

U.S. PATENT DOCUMENTS

| | | | |
|---|---|---|---|
| 3,660,649 | 5/1972 | Gilchrist et al. | 235/193 |
| 3,694,637 | 9/1972 | Edwin et al. | 235/151.3 |
| 3,705,516 | 12/1972 | Reis | 73/71.4 |
| 3,714,822 | 2/1973 | Lutz | 73/104 |
| 3,752,966 | 8/1973 | Foy, Jr. et al. | 235/150.1 |
| 3,761,701 | 9/1943 | Wilder et al. | 73/151.5 |
| 3,834,615 | 9/1974 | Watanabe et al. | 235/151.11 |
| 3,841,149 | 10/1974 | Edwin et al. | 73/71.4 |
| 3,881,695 | 5/1975 | Joubert | 254/172 |
| 4,176,396 | 11/1979 | Howatt | 364/551 |
| 4,195,699 | 4/1980 | Rogers et al. | 73/151.5 |
| 4,314,339 | 2/1982 | Kenyon | 364/422 |
| 4,326,257 | 4/1982 | Sata et al. | 364/508 |
| 4,354,233 | 10/1982 | Zhukovsky et al. | 364/420 |
| 4,407,017 | 9/1983 | Zhilikov et al. | 364/420 |
| 4,432,064 | 2/1984 | Barker et al. | 364/550 |
| 4,471,444 | 9/1984 | Yee et al. | 364/475 |
| 4,627,276 | 12/1986 | Burgess | 75/151 |
| 4,639,868 | 1/1987 | Tanaka et al. | 364/420 |

FOREIGN PATENT DOCUMENTS 2178872 2/1987 United Kingdom .

Primary Examiner—Jerry Smith
Assistant Examiner—Kimthanh T. Bui
Attorney, Agent, or Firm—Richards, Harris, Medlock & Andrews

[57] ABSTRACT

Disclosed is a real-time method for determining when a drill bit that is being used in drilling operations should be replaced, given the objective of minimizing the total expected, controllable costs of a well. The basis of the bit replacement decision is a direct comparison of the total expected, controllable unit cost of the current bit in the borehole to the total expected, controllable unit cost of a replacement bit over a specified interval of analysis.

11 Claims, 3 Drawing Sheets

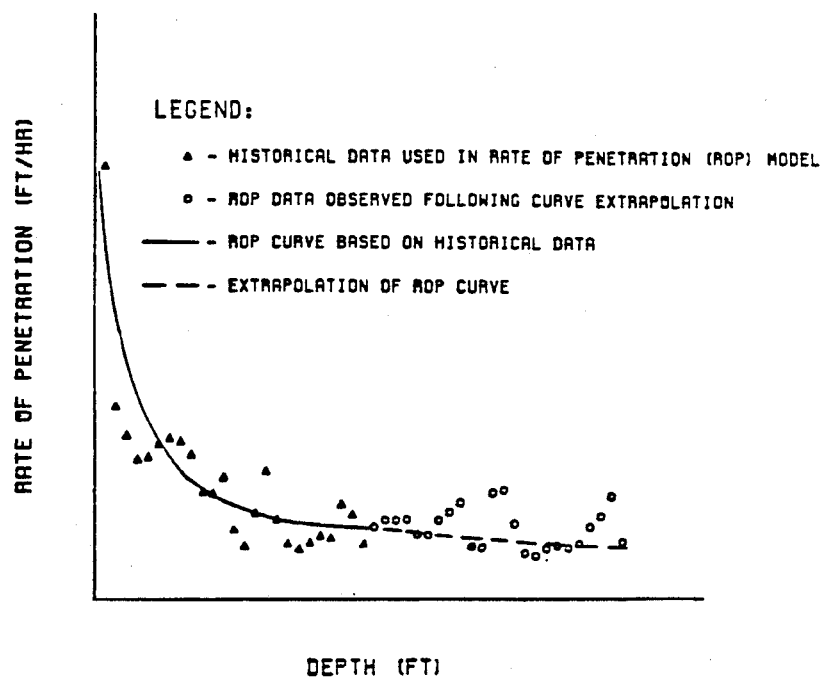
FIGURE 1. PREDICTIVE PENETRATION RATE MODEL
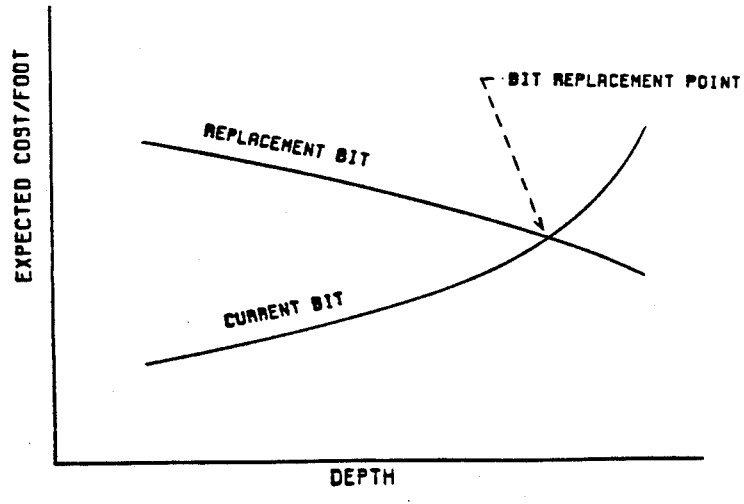
FIGURE 2. COST PER FOOT EXPECTED FOR CURRENT BIT AND REPLACEMENT BIT OVER THE REMAINING LIFE OF THE CURRENT BIT.

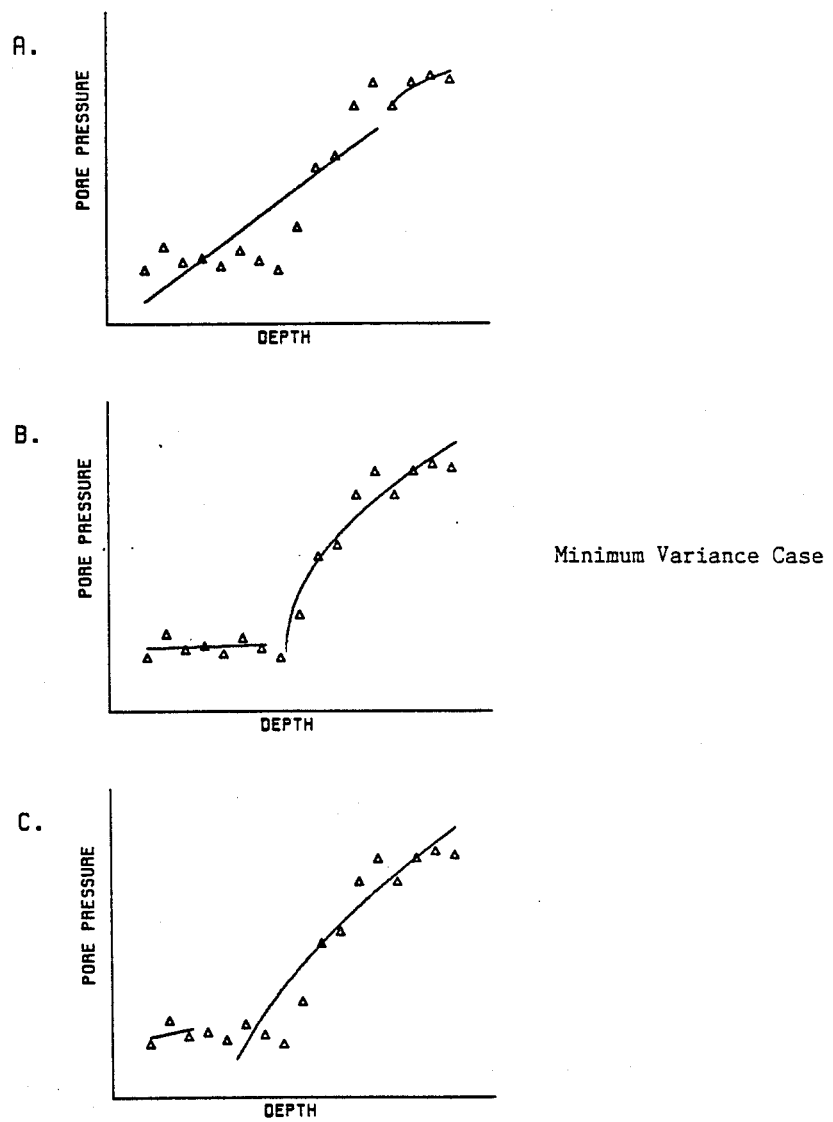
Minimum Variance Case
FIGURE 3. IDENTIFICATION OF
ABNORMALLY PRESSURED
FORMATIONS

METHOD FOR DETERMINING ECONOMIC DRILL BIT UTILIZATION

TECHNICAL FIELD

This invention relates to drilling operations, and more particularly to a method based on future economic factors for determining when a drill bit that is being used in drilling operations should be replaced.

BACKGROUND ART

A. Field of the Invention

This invention relates to a method based on future economic factors for determining when a drill bit that is being used in drilling operations should be replaced. The principal application for the present method is in drilling for hydrocarbons both onshore and offshore; however, the present method is applicable to any type of drilling, mining, or manufacturing operation that requires the periodic replacement of a bit or tool.

The cost of drilling a well is a function of the rate at which the well can be drilled which, in turn, depends on the penetration rate of each drill bit, a unit of measure that quantifies the rate at which the bit enters the subsurface formation. In general, the penetration rate, in feet per hour, decreases over the life of the bit as it wears. (See FIG. 1). This decrease in the penetration rate and the resulting increase in the expected unit cost necessitates an eventual decision by drilling or engineering personnel to replace the bit.

The bit replacement decision is important in economic terms because higher drilling costs will result if the bit is pulled too soon or if it is left in the borehole too long. The present method ensures that the bit replacement decision is made at the optimal point that minimizes expected controllable unit drilling costs.

The bit replacement process requires a "trip", an operation in which the drill string, consisting of drill pipe, drill collars, stabilizers, and the drill bit, is pulled out of the hole. The bit has to be replaced, and the entire assembly must be lowered back into the hole before drilling can commence.

On most drilling rigs, the bit replacement decision is made on the basis of subjective estimates of the extent of bit wear, i.e., a bit that is "worn out" should be replaced. In certain cases, consideration is given to the economics of bit replacement; however, previous techniques used to quantify the replacement decision are not correct. Th present method, by contrast, directly compares the current bit and a replacement bit on the basis of the total expected controllable unit cost over a future drilling interval. (See FIG. 2).

The comparison of the current bit with a replacement bit depends on an accurate, predictive penetration rate model. The penetration rate model given in this invention is a multivariate model consisting of drilling variables that are known to have a significant effect on the penetration rate of a bit under real-time conditions.

In the normal operating mode, the present method is concerned with the question of bit replacement as opposed to bit selection. The decision generated by the present method is based on data collected on the current bit and thus in the normal operating mode applies to a replacement bit of the same design.

The methodology described in this invention utilizes a predictive variance statistic which ensures that the penetration rate model is based on the best available predictor variables. With this statistic, variables that may be quantified through future technological advances may be evaluated for inclusion in the penetration rate model.

The invention also describes an expression for calculating the total expected controllable unit cost which allocates bits costs, rig operating costs, and tripping costs over a future drilling interval.

B. Description of the Prior Art

The most common method of determining when a drill bit should be changed is based on the experience of on-site drilling personnel who make subjective decisions regarding the condition of the bit. When the bit is judged to be either completely or extensively worn, it is replaced. This method minimizes one cost component, the cost of the bit, while disregarding the operating cost of the rig which, in many cases, is a more significant cost. Consequently, it is only a matter of coincidence if bit changes based on complete wear of the bit also result in the minimum expected unit cost.

On occasion, a drill bit change schedule is formulated prior to the actual drilling of the well. This method, referred to herein as the "correlation approach", is based on examining the drilling records of wells that were drilled in the same general region of the proposed well and reflects the subjective approach to estimating bit wear previously described. In this method, a drilling engineer attempts to correlate the penetration rate of the drill bits with the lithology of the wells in which they were used. By assuming that the lithology of the proposed well will be virtually identical to other wells in the same area and by assuming that the bit should be changed when it is "worn out", the drilling engineer formulates a bit change schedule for the proposed well based upon the bit changes that occurred in adjacent wells. The correlation approach to the bit replacement decision is inadequate if the objective is to minimize the expected controllable unit cost of the well. However, the correlation method may correctly be used for bit selection purposes, i.e., to decide what type bit should be ueed in different zones of the well.

Yet another bit replacement method attempts to quantify the decision by determining the historical cost per foot of the bit presently in the hole and comparing this value to some proprietary threshold value of cost per foot previously established by the drilling company or its client. As it is used herein, the term "historical cost per foot" refers to unit costs determined by allocating all previous bit, tripping and operating costs over the actual interval drilled with the current bit. There are several shortcomings associated with this method including the following: (1) only historical costs attributed to the current bit are calculated, i.e., the expected unit costs of the current bit are not directly compared with the expected unit costs of a replacement bit, (2) it does not differentiate between costs that are properly allocated to the current bit versus those that should be allocated to a replacement bit, and (3) a corporate threshold value of cost per foot is based on costs incurred in other wells and may have no relevance to the hole being drilled.

In a variation of this technique, the instantaneous penetration rate (or some approximation thereof such as the rate computed over an interval of five or ten feet) is compared to a proprietary company value of penetration rate based on some threshold cost per foot value. When the instantaneous penetration rate falls below the company threshold value, bit replacement is recommended.

U.S. Pat. No. 3,752,966 of Foy, Jr. and Chang is based on the assumption that the bit should be changed when the historical cost per foot begins to increase. This method assumes that the historical cost per foot decreases as bit and tripping costs are prorated over an increasing interval of footage drilled. However, when the bit begins to wear significantly, the increasing marginal cost per foot that results from a decreasing penetration rate has a greater effect on the historical cost per foot and causes it to rise. According to Foy, Jr. and Chang, if the most recently calculated cost per foot exceeds the prior value, bit replacement is recommended.

There is no assurance that the method of Foy, Jr. and Chang minimizes the expected cost per foot since only two historical cost values of the current bit are being compared. The current bit is not directly compared to a replacement bit nor does the method reflect future penetration rate patterns or the expected cost per foot arising thereof. Additional problems may arise if this method is used without regard to projected aasing setting depths or logging intervals since an unnecessary trip to change the bit might occur within a short interval of a nondiscretionary trip.

DISCLOSURE OF THE INVENTION

The method of the present invention consists of a real-time, predictive penetration rate model that incorporates significant drilling variables. A predictive variance statistic is used to quantify data quality as well as the predictive ability of drilling variables and prospective penetration rate models.

Another technique, transition point analysis, determines model parameters representing the sensitivity of the penetration rate of a bit to changes in selected drilling variables even when data are acquired from different lithologies. A regression analysis is used to assign parameters to the remaining variables. Taken together, these techniques result in a real-time, predictive penetration rate expression that is unique to each bit run of each hole drilled.

In accordance with another aspect of the present method, a method is provided which extrapolates the penetration rate expression over a future drilling interval and estimates the depth and time required for the bit currently in the hole to drill to a specified degree of bit wear. The calculated values of depth and time along with bit costs are inputs to an expected, controllable unit cost expression for the current bit. In a similar manner, the present method calculates an expected, controllable unit cost for a replacement bit, and compares both bits to determine which one will yield the lower expected, controllable unit cost over the interval of interest.

The present method further considers predetermined casing setting and logging depths, bit costs and rig rates, variable tripping times, and number of stands of pipe pulled. In addition, the present method contains provisions for handling phenomena such as abnormally pressured formations.

In optional modes, combinations of drilling variables, parameters, and intervals comprising different lithologies can be simulated, and the effects on the expected, controllable unit costs and the replacement bit decision can be examined.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 is a graph of rate of penetration versus depth for a predictive penetration rate model;

FIG. 2 is a graph of expected cost per foot for the current bit and a replacement bit versus depth;

FIGS. 3A, 3B and 3C are graphs of pore pressure versus depth for the identification of abnormally pressured formations.

DETAILED DESCRIPTION

A. Predictive Penetration Rate Model

Figure 4:
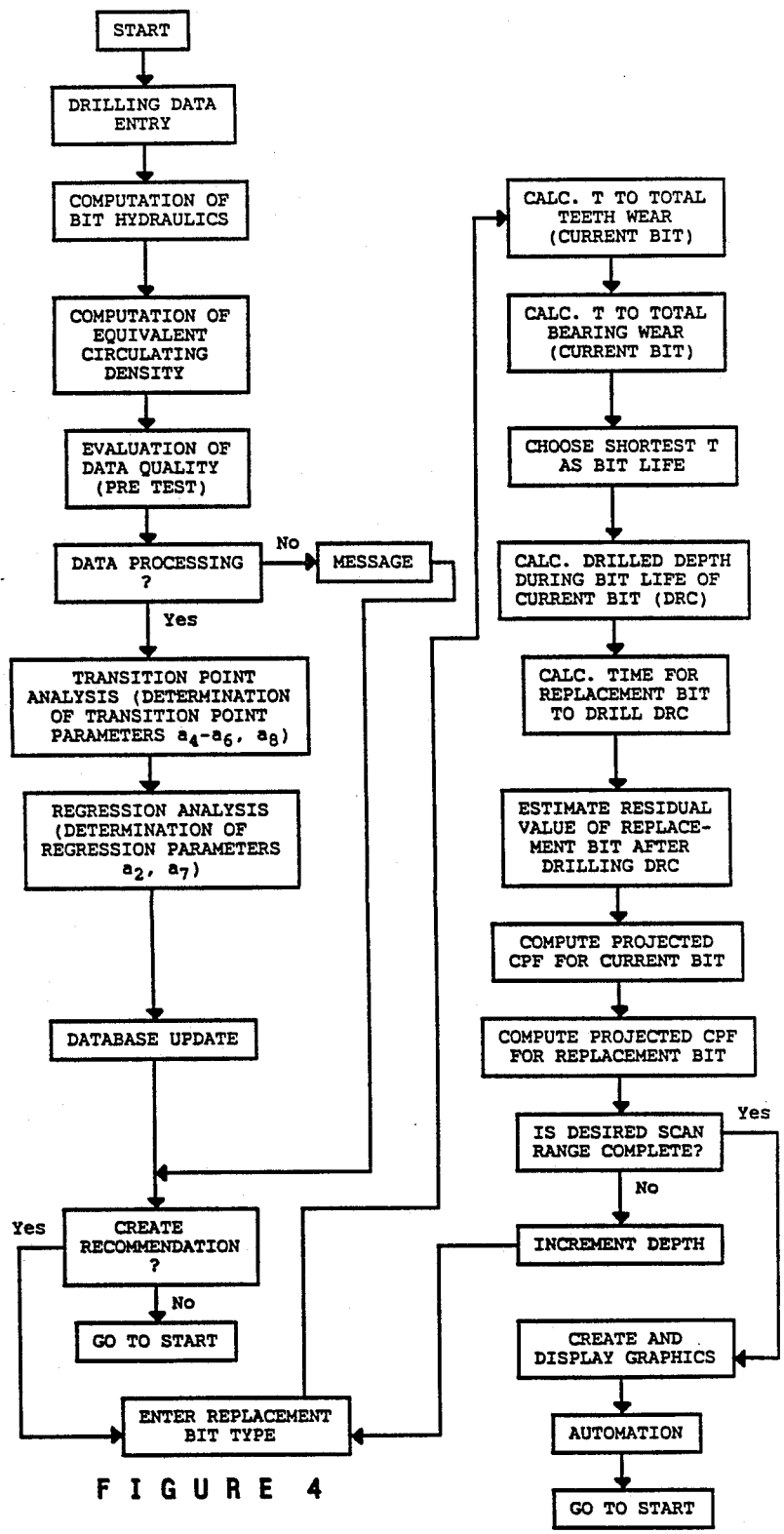
FIG. 4 is a flowchart illustrating the method of the present invention.

The present invention utilizes a real-time, multivariate, predictive penetration rate model, an example of which is set forth in Equation 1. When multiple penetration rate models are available, the present method identifies the best predictive model through the use of a predictive variance statistic.

Equation 1 is comprised of important drilling variables that are known to affect the penetration rate of a bit. These variables and mechanisms can be directly measured or represented through empirical relationships. The model also contains provisions that make it dynamic, i.e., it is unique to both the operating conditions and lithology of each bit run on which it is used.

$$dD/dt = K^* (W/\pi d^2)^{a_1} * (N/60)^{a_2} * (BH)^{a_3} * exp(-a_4 w + a_5(g_p) + a_6(g_p - p_E) + a_7(10000 - D)) \quad (1)$$

where:
  $dD/dt$ = penetration rate of the bit
  $K$ = general coefficient that captures effects of lithology and variables not explicitly quantified
  $W$ = weight on bit
  $d$ = bit diameter
  $N$ = rotary speed
  $BH$ = bit hydraulics
  $exp$ = exponential function $[exp(x) = e^x]$
  $w$ = fractional bit wear
  $g_p$ = pore pressure
  $p_E$ = equivalent circulating density
  $D$ = depth
  $a_1$ to $a_7$ = parameters calculated for each variable; W, N, BH, w, $g_p$, $p_E$ and D, respectively.

In addition to the variables in Equation 1 that are explicitly considered by the present method, the penetration rate model also takes into account mud properties and other drilling variables that affect the equivalent circulating density, $p_E$.

Directly measured mud properties include the following:
  $p_s$ = density of the cuttings
  $p_m$ = density of the mud
  $D_s$ = diameter of the cuttings
  Mud rotational viscometer readings Calculated mud properties include the following:

Bingham fluids $\mu_a$ = apparent viscosity of drilling fluid
$\tau_y$ = yield point of drilling fluid

Power-Law fluids

K = consistency index
n = flow behavior index

The following variables are calculated for both Bingham and Power-Law fluids:

$\bar{v}$ = average flow velocity of drilling fluid in the annulus
T = transport ratio of cuttings in drilling fluid
$v_s$ = particle slip velocity in drilling fluid
SF = solids fraction in analysis
$P_c$ = casing pressure
$P_{da}$ = frictional pressure loss in analysis
$\rho_{(f)a}$ = average fluid density in analysis (mud and cuttings)

The present method considers mud systems based on either Bingham or Power-Law type fluids, and the fluid relationships used are as follows:

Calculation of Frictional Pressure Loss and Average Fluid Density

Frictional Pressure Loss, $P_{(f)a}$:

The frictional pressure loss in the annulus is calculated by examining the fluid type and determining if it conforms to laminar or turbulent flow.

For the assumed fluid, the unit frictional pressure loss, $dP_f/dL$, is calculated for both the laminar and turbulent cases, and the larger value is assumed to represent the better approximation to actual flow conditions. Unit frictional pressure loss expressions for each type of fluid are given as follows:

Bingham Plastic Fluid

Laminar flow:

$$\frac{dP_f}{dL} = \frac{\mu_p * v}{1000(d_2 - d_1)^2} + \frac{\tau_y}{200(d_2 - d_1)} \quad (2)$$

Turbulent Flow:

$$\frac{dP_f}{dL} = \frac{\rho^{.75} v^{1.75} \mu^{.25}}{1396(d_2 - d_1)^{1.25}} \quad (3)$$

Newtonian Fluid

Laminar flow:

$$\frac{dP_f}{dL} = \frac{\mu_p * v}{1000(d_2 - d_1)^2} \quad (4)$$

Turbulent Flow:

$$\frac{dP_f}{dL} = \frac{\rho^{.75} v^{1.75} \mu^{.25}}{1396(d_2 - d_1)^{1.25}} \quad (5)$$

Power-Law Fluid

Laminar Flow:

$$\frac{dP_f}{dL} = \frac{K v^n [(2 + 1/n)/0.0208]^n}{144000(d_2 - d_1)^{1+n}} \quad (6)$$

Turbulent flow:

$$\frac{dP_f}{dL} = \frac{f \rho v^2}{21.1(d_2 - d_1)} \quad (7)$$

where: f = Fanning friction factor

Total frictional pressure losses in the annulus, $P_{(f)a}$, are calculated as follows:

$$P_{(f)a} = \sum_{i=1}^{n} (dP_f/dL)_i * L_i \quad (8)$$

where:
$(dP_f/dL)_i$ = unit annulus frictional pressure loss in section i
$L_i$ = length of drillstring section i
n = number of annulus sections Average Fluid Density, $\rho_{(f)a}$:

Following are the steps in the calculation of the average fluid density for each drillstring section:

Mud apparent viscosity, $\mu_a$:

$$\mu_a = K/144[(D_o - D_i)/\bar{v}]^{1-n} * [(2 + 1/n)/0.028]^n \quad (9)$$

Slip velocity, $v_s$:

The slip velocity of the cuttings traveling through the annulus is as follows:

$$v_{(s)laminar} = 82.87\ D_s(\rho_s - \rho_f)/\mu_a \quad (10)$$

$$v_{(s)intermediate} = [2.9\ D_s(\rho_s - \rho_f)^{0.667}]/(\rho_f^{0.333} * \mu_a^{0.333}) \quad (11)$$

$$v_{(s)turbulent} = 1.45\ D_s^{0.5} * [(\rho_s - \rho_f)/\rho_f]^{0.5} \quad (12)$$

The lowest value of $v_s$ should be chosen as the actual slip velocity.

Average velocity, $\bar{v}$:

The average velocity in the annulus is as follows:

$$\bar{v} = q_m/[2.448\ (d_2^2 - d_1^2)] \quad (13)$$

where:
$q_m$ = volumetric pump flow rate
$d_1$ = outside pipe diameter
$d_2$ = inside casing diameter Transport ratio, T:

$$T = 1 - v_s/\bar{v} \quad (14)$$

Solids fraction, SF:

$$SF = q_s/(q_s + T * q_m) \quad (15)$$

where: $q_s$ = volumetric flow rate of cuttings

Average fluid density, $\rho_{(f)a}$:

$$\rho_{(f)a} = \rho_m(1 - SF) + \rho_s(SF) \quad (16)$$

The average fluid density over the entire drillstring section is the weighted average of fluid densities in each section as follows:

$$\rho_{f)a} = \frac{\sum_{i=1}^{n} (\rho_{f)a})_i * L_i}{L * n} \quad (17)$$

where:
$(\rho_{(f)a})_i$ = fluid density in section i
L = total drillstring length

B. Predictive Variance Analysis

A principal objective of the present invention involves translating real-time penetration rate data into a real-time, predictive penetration rate expression. In order to accomplish this, the present invention utilizes a predictive variance statistic that measures the predicted residual error, hereinafter referred to by its acronym, "PRE". PRE is used for the following purposes: (1) evaluation of data quality, (2) evaluation of variables comprising the penetration rate model(s), (3) differentiation between variables representing similar drilling mechanisms, (4) evaluation of predictive ability of penetration rate model(s), and (5) evaluation of prospective penetration rate models in addition to the one given in Equation 1 of this invention.

PRE compares predicted penetration rate values with actual penetration rate data and computes the resulting variance. The predicted values are determined on the basis of prior data, i.e., a given point is not used in the prediction of itself nor are data from depths greater than the point in question used for prediction purposes. PRE quantifies the predictive ability of the penetration rate model as follows:

$$PRE = \frac{\left[\sum_{i=m}^{n} (y_i - \hat{y}_i)^2\right]^{\frac{1}{2}}}{n - m} \quad (18)$$

where:
PRE = predicted residual error
$y_i$ = actual penetration rate value at point i
$\hat{y}_i$ = predicted penetration rate value at point i based on data from some interval prior to i
n = total number of data points
m = minimum number of data points to estimate $\hat{y}_i$ The present invention uses PRE for multiple purposes which are discussed as follows:

Evaluation of Data Quality

The PRE score functions as an index representing the quality of the data acquired, and hence, the confidence level that can be associated with the predictor expression. If the data are dispersed too widely, the resulting variance will be large and a ppredictive expression based on the data may not be reliable. Consequently, a threshold PRE value is established and the actual PRE scores are compared to this limit prior to displaying the results of the bit replacement reoommendation.

Evaluation of Variables

PRE routinely evaluates each variable in the model for its contribution to the reduction in the predicted residual error. This procedure, which is a step-wise algorithm, can be performed for any number or sequence of variables.

Variable Contribution Penetration Rate
Model = $X_{m+1} - X_m$      (19)

An example is as follows:

| Variables Included in Penetration Rate Model | PRE Score | Contribution of Most Recently Added Variable |
|---|---|---|
| W | $x_1$ | |
| W, N | $x_2$ | $x_2 - x_1$ |
| W, N, BH | $x_3$ | $x_3 - x_2$ |
| W, N, BH, w | $x_4$ | $x_4 - x_3$ |
| W, N, BH, w, $g_p$ | $x_5$ | $x_5 - x_4$ |
| W, N, BH, w, $g_p$, ($g_p - \rho_E$) | $x_6$ | $x_6 - x_5$ |
| W, N, BH, w, $g_p$, ($g_p - \rho_E$), D | $x_7$ | $x_7 - x_6$ |

The preceding sequence of evaluations can be altered in optional modes.

While all the variables in Equation 1 are normally sigificant in explaining the mechanisms of the penetration rate, the present method does not automatically assume that the predictive ability of either Equation 1 or other prospective penetration rate models is improved by including all the variables. PRE insures that the inclusion of each variable in the predictive expression is continually justified.

Future instrumentation advances may result in quantifying new variables such as bit wear, bearing wear, formation pore pressure, or other drilling effects that are not presently available through real-time measurements. These new variables should be evaluated with PRE and incorporated in the present method if their inclusion improves the predictive ability of the penetration rate model.

Instrumentation advances may also permit variables to be directly measured downhole an opposed to measured at the surface or represented by empirical relationships. These "new" variables should be evaluated through PRE for possible inclusion in the penetration rate model or as substitutes for variables already in the model.

Differentiation Between Variables Representing Similar Mechanisms

PRE can be used to distinguish between variables that represent similar drilling mechanisms. For example, PRE determines whether bit horsepower or jet impact force is the better predictor variable representing the hole-cleaning effect. The variable that yields a lower PRE score is used in subsequent extrapolations of the penetration rate.

Evaulation of Predictive Ability of Penetration Rate Model

PRE routinely evaluates the predictive ability of the real-time penetration rate model given in Equation 1. If the PRE score exceeds established limits, the method temporarily suspends recommendations regarding bit replacement. When the PRE score falls within the defined limits, bit replacement recommendations are resumed.

Evaluation of Prospective Penetration Rate Models

PRE can be used to evaluate penetration rate models other than the one given in Equation 1. Models with different variables or different mathematical expressions can be evaluated for their predictive ability on the basis of their PRE scores over some defined interval of analysis. The present method identifies and applies the predictive penetration rate model with the best PRE score.

C. Description of Variables in Penetration Rate Model

The present method utilizes the penetration rate model that is the best predictor expression for the penetration rate pattern. The variables that comprise Equation 1 were chosen because they represent drilling phenomena that are known to significantly affect the penetration rate of a bit.

Formation Drillability

Formation properties such as rock hardness are captured in K, the formation drillability factor. K is computed following calculation of the parameters $a_1$ to $a_7$ from a prior bit run and, consequently, represents a weighted average of the formations encountered during the prior bit run.

$$K = \sum_{i=1}^{n} [(dD/dt)_i / (W/\pi d^2)_i a_1 * (N/60)_i a_2 * (BH)_i a_3 * \exp(-a_4 w_i + a_5(g_p)_i + a_6(g_p - \rho_E)_i + a_7(10000 - D)_i)] \quad (20)$$

where:
n = number of data points

K may also represent the effects of other factors that are not explicitly measured such as the extent of sticking of the drillstring to the wellbore or the type of bottomhole assembly used. As an alternative to Equation 20, K may be calculated with a regression procedure.

Weight on Bit

The weight on the drill bit is routinely measured on most rigs. Since pressure exerted by the bit on the formation has a greater effect on the penetration rate than gross weight, the "weight on bit" is divided by the area of the bit currently being used.

Rotary Speed

The rotary speed of the drillstring is a routinely measured variable and both by convention and for statistical purposes is divided by 60 rpm in the present method.

Bit Hydraulics

Bit hydraulics can be represented by either bit horsepower or jet impact force. As previously described, the present method uses the predictive variance statistic, PRE, to determine whether bit horsepower or jet impact force better describes the penetration rate. The form of each bit hydraulics variable is as follows:

Horsepower Expended Across the Bit:

$$P_{BHP} = (\Delta P_{bit} * q_m) / 1714$$

where: $\Delta P_{bit} = P_p - P_s - P_{(f)d} + H_d - H_a - P_{(f)a} - P_c \quad (21)$ $P_p$ = pump pressure
$P_s$ = surface equipment pressure losses
$P_{(f)d}$ = frictional pressure losses in the drill pipe
$H_d$ = hydrostatic pressure in drill pipe
$H_a$ = hydrostatic pressure in analysis
$P_{(f)a}$ = frictional pressure losses in analysis
$P_c$ = casing head pressure
$q_m$ = volumetric pump flow rate Jet Impact Force Expended Beneath the Bit:

$$F_j = 0.01823 * C_d * q_m * (\rho_m * \Delta P_{bit})^{\frac{1}{2}} \quad (22)$$

where:
0.01823 = constant based on field engineering units
$C_d$ = discharge coeffecient
$\rho_m$ = mud density $$\Delta P_{bit} = P_p - P_s - P_{(f)d} + H_d - H_a - P_{(f)a} - P_c$$

Bit Wear

Bit wear, w, is explicitly considered in Equation 1; however, there presently is no method for obtaining real-time measurements of the extent of bit wear while the bit is in the hole. Consequently, the present method estimates bit wear based on the formation abrasiveness of a prior bit run.

The present method requires an estimate of the final extent of bit wear to be input at the end of each bit run in order to quantify the formation abrasiveness. Operating personnel can grade the bit on a percentage worn basis, i.e., the bit may be judged to be 1 to 100% worn. Alternatively, the bit may be graded in $\frac{1}{8}$ increments with 0 representing zero bit wear and 1.0 representing complete bit wear.

Formation Pore Pressure

The formation pore pressure gradient, gp, is directly related to the degree of compaction or undercompaction of the rock matrix. During drilling, the formation pore pressure gradient affects the degree of underbalance or overbalance which is the differecce between $g_p$ and the equivalent circulating density of the wellbore fluid, $\rho_E$. A higher pore pressure increases the rate at which cuttings are removed from the region immediately under the bit.

Direct Measurement of Pore Pressure

A direct measurement of $g_p$ is the best source of an accurate pore pressure value and, if available through downhole equipment such as Measurement While Drilling systems or similar instrumentation, should be evaluated with PRE.

Identification of Abnormally Pressured Formations using Direct Pore Pressure Measurement If a direct downhole measurement of pore pressure is available, abnormally pressured formations representing deviations from a constant gradient level can be determined. The prediction score, PRE, is continuously evaluated over a fixed interval, and, in a normally pressured formation, can be expected to fall within defined statistical limits. The present method identifies abnormally pressured formations when the PRE score exceeds these limits.

The method will incorporate the new values of pore pressure in the penetration rate model and adjust the output accordingly. A graph of pore pressure versus depth is also available to operating personnel.

Pore Pressure Determination in the Absence of Direct Measurement

In the absence of a true pore pressure measurement, the present method assumes a constant pore pressure gradient. Instead of determining a specific value of $g_p$, the method assumes that the term, $a_5$ times $g_p$, is a constant which can be captured in the drillability factor, K. Hence, the term $a_5 g_p$ disappears from both Equation 1 and Equation 20, and a constant is substituted for $g_p$ in the calculation of $a_6$. The assumption of constant $g_p$ is valid in a normally pressured formation, but is invalid in an abnormally pressured zone.

Identification of Abnormally Pressured Formations in the Absence of Direct Pore Pressure Measurement If a direct pore pressure measurement is not available, the present method calculates a normalized penetration rate in addition to the penetration rate given by Equation 1. If all parameters are known, the normalized penetration rate is as follows:

$$(dD/dt)_{norm} = dD/dt/[(W/\pi d^2)^{a_1} * (N/60)^{a_2} * (BH)^{a_3} * \exp(-a_4 w + a_7(10000-D))] \quad (23)$$

If parameters for any of the variables are not known, the corresponding terms are omitted from Equation 23.

When both PRE scores and normalized penetration rate values increase simultaneously over a specified interval, the method identifies the new data as possibly representing an abnormally pressured zone.

Identification of Tops of Abnormally Pressured Formations in the Absence of Direct Pore Pressure Measurement Starting from the present depth and considering a previously drilled interval, the method calculates a second order least squares expression using part of the most recent data and performs a first order least squares on the balance of the data. The method then calculates and sums the variance over each interval. In subsequent operations, the method includes steps to increment the data set and repeat the preceding variance analysis until all of the data in the defined interval have been included in the second order curve.

The minimum total variance represented by some combination of second order and linear models is chosen as the optimal combination. The intersection of the first order and second order models identifies the deflection point which represents the top of the abnormally pressured zone as shown in FIG. 3.

The present method temporarily suspends bit replacement recommendations and calculates estimates of the pore pressure based on a modified "d exponent" procedure. Operating personnel can request tabular or graphic displays of this empirical estimate of formation pore pressure during the interval in which the normal operating mode of the method has been suspended.

Pore Pressure Calculation Based on a Modified D-Exponent

A d-exponent is calculated as follows:

$$d_{exp} = \frac{\log((dD/dt)/60\,N)}{\log(12\,W/1{,}000\,d_b)} \quad (24)$$

A modified $d_{exp}$, $d_{mod}$, is given as follows:

$$d_{mod} = d_{exp} * \rho_n / \rho_E \quad (25)$$

where $\rho_n = 9.0$

An estimate of pore pressure, $g_p$, is given by the following empirical expression:

$$g_p = 7.65 \log[d_{(mod)n} - (d_{mod})] + 16.5 \quad (26)$$

where: $d_{(mod)n}$ = extrapolated normal penetration rate trend.

The present procedure returns to the normal operating mode when the PRE score returns to a defined level i.e., less than the threshold value. The PRE score is based on new parameter values and a new drillability factor calculated from data that includes the abnormally pressured region.

Equivalent Circulating Density

The equivalent circulating density, $\rho_E$, is an approximation of the fluid density which, under noncirculating conditions, yields a bottom hole pressure equivalent to the bottom hole pressure observed under circulating conditions. As used in the present method, $\rho_E$ is based on the following expression:

$$\rho_E = \frac{P_c + P_{f)a} + (0.052 * \rho_{f)a} * D)}{0.052 * D} \quad (27)$$

where:

$P_{(f)a}$ = frictional pressure loss in the annulus
0.052 = constant based on field engineering units The frictional pressure loss in the annulus and the average fluid density are inputs to the equivalent circulating density, and their calculation is described in Equations 2-17.

D. Calculation of Parameters for Variables in Penetration Rate Model

The present method calculates parameters $a_1$ to $a_7$ for the bit currently in the hole. These unique constants make the model dynamic because they reflect the drilling conditions and lithology of the hole as it is being drilled. Parameters $a_1$, $a_2$, $a_3$, and $a_6$ are calculated with a technique called transition point analysis which is also used to calculate parameter $a_5$ if a pore pressure measurement is available. Parameters $a_4$ and $a_7$ are calculated with a regression procedure.

If the bit type remains unchanged, the parameters $a_1$ to $a_7$ should remain unchanged over a given bit run. However, in order to insure that the extrapolation of the penetration rate model closely approximates the next interval to be drilled, the parameters are calculated from data representing some specified interval drilled just prior to the present depth. For example, if the bit is at 8800 feet, data from an interval drilled prior to the 8800 foot depth are used to calculate $a_1$, $a_2$, $a_3$, $a_5$, and $a_6$.

Parameter $a_4$ is estimated from a prior bit run while parameter $a_7$ is calculated for the entire interval drilled from the beginning of the well. Because the parameters are calculated over an extended depth interval, they may reflect data from different types of lithologies.

Data are acquired continuously as long as the bit type is the same, even if a trip to replace the bit occurs during the interval. If the bit type changes, a new interval must be drilled or a minimum amount of data must be acquired. If a minimum amount of data have not been collected during the current bit run, the penetration rate model uses parameters from a bit run prior to the current bit run.

Parameter Calculation By Transition Point Analysis

Transition point analysis is a method used to calculate selected model parameters which reflect the sensitivity of the penetration rate to changes in drilling variables as opposed to changes resulting from different types of formations. As a result, transition point analysis can be applied even when data are collected from different lithologies.

Other authors have recognized that a given penetration rate response could be due to a change in a drilling variable or to a change in lithology. However, the relative contributions of lithology changes versus drilling variable changes were indistinguishable due to the summation procedure of the rerression analysis that was usually employed. In an attempt to avoid this restriction, other authors specified that the parameters and coefficients should be calculated with a regression procedure only if the data were known to be from constant lithology such as shale.

The present method is not limited by the preceding constraint; the sensitivity of the penetration rate to changes in drilling variables can be calculated regardless of the lithology. Transition point analysis is used to calculate the parameters $a_1$, $a_2$, $a_3$, $a_5$, and $a_6$ which are measures of the sensitivity of the penetration rate to a change in weight on bit, rotary speed, bit hydraulics, pore pressure, and equivalent circulating density, respectively.

Transition point analysis is based on identifying points at which the penetration rate has changed due to a change in a drilling variable. The examination of the penetration rate data occurs over a very small drilling interval and thus is unlikely to include lithology-induced fluctuations.

By definition, variables whose parameters are not being calculated at the transition point in question must remain constant or the penetration rate must be normalized for their effects. An example of the calculation of the parameter $a_2$ for rotary speed, N, by transition point analysis is as follows:

$$\frac{dD/dt_1}{dD/dt_2} = \frac{C_{eff1} * (N_1/60)^{a_2}}{C_{eff2} * (N_2/60)^{a_2}} \quad (28)$$

where: $C_{eff}$ represents all other terms in Euuation 1 which remain constant so $C_{(eff)1} = C_{(eff)2}$. Thus:

$$\text{thus } a_2 = \frac{\log(dD/dt_1/dD/dt_2)}{\log(N_1/N_2)} \quad (29)$$

If more than one variable changes at the transition point, such as both bit weight and rotary speed, the penetration rate model can be normalized for the effects of one of the variables prior to calculating the parameter for the other variable. Normalization of the model for a change in weight on bit prior to the calculation of $a_2$ for rotary speed is as follows:

$$dD/dt_{1 \text{ normalized}} = \frac{(dD/dt)_1}{(W_1/\pi d^2)^{a_1}} \quad (30)$$

$$dD/dt_{2 \text{ normalized}} = \frac{(dD/dt)_2}{(W_2/\pi d^2)^{a_1}} \quad (31)$$

The normalized penetration rates are substituted for $dD/dt_1$ and $dD/dt_2$, respectively, in Equation 28. In order to calculate $a_1$ or $a_2$ at a transition point where both variables have changed, it is necessary that one of the parameters is already known. Therefore use of the present method is based on some initial transition point where only one variable changes before evaluating subsequent transition points with multiple variable changes.

If data in single variable transition points are not available in the course of routine operations, the method causes a display to generate a message requesting that values of the variables of interest be fractionally changed. Alternatively, data from a conventional drill-off test can be incorporated in the method at the discretion of operating personnel.

The calculated parameters measure the sensitivity of the penetration rate of the bit to the individual drilling variables exclusive of significant lithology-induced fluctuations. However, the type of lithology in which the parameters are calculated has some effect on the relative magnitude of the parameters. For example, a set of parameters calculated in sand may differ from a set of parameters calculated in shale. Unless operating personnel specify otherwise, the method assumes that the mix of formations to be drilled will approximate the mix of formations previously drilled. As a result, each of the parameters applied in the predictive penetration rate model is an average value based on transition points that may have occurred in different lithologies. The calculation of an average value for each parameter is as follows:

$$a = \sum_{i=1}^{n} a_i/n \quad (32)$$

where:
  $a$ = average parameter value
  $a_i$ = calculated parameter value
  $n$ = total number of transition points Because the method uses average parameters which are expected to more accurately reflect the mix of formations to be drilled, operating personnel are not restricted to applying the output of the model to zones of known lithology.

Parameter Calculation by Regression Analysis

Parameters $a_4$ and $a_7$ are calculated for bit wear and depth by a regression procedure. Under normal conditions, changes in these variables occur gradually, and a longer drilling interval can be used for evaluation. The longer interval of analysis permits smoothing of variations that may be attributed to lithology fluctuations.

E. Intermediate Calculations

The objective of the present method is to generate a bit replacement recommendation by comparing expected, controllable unit costs of the current bit and a replacement bit. However, before this can be accomplished, the incremental depth and time that can be drilled by the bit currently in the hole must be calculated. Other intermediate calculations that must be performed include estimates of formation abrasiveness and bit wear.

Average Values of Weight on Bit and Rotary Speed

The method uses average values of both weight on bit and rotary speed, W and N, which are calculated for an interval drilled by a previous bit. These values are used in subsequent expressions for bit wear and formation abrasiveness.

$$\overline{W} = \sum_{i=1}^{n} W_i/n \quad (33)$$

where:
  $\overline{W}$ = average value of weight on bit
  $W_i$ = individual observations of weight on bit taken at regular intervals n = total number of observations
An average value for $\bar{N}$ is calculated similarly.

Formation Abrasiveness The lithology encountered during a previous bit run is selected as an approximation to the lithology of the current bit run. Unless otherwise specified by operating personnel, the method uses the value of formation abrasiveness, $\tau_H$, from a previous bit run as a proxy for the value of $\tau_H$ for the current bit run.

An expression for the formation abrasiveness of a previous bit run is as follows:

$$\tau_H = \frac{t_{bp}}{C_{1p} * (w_p + H_2(w_p^2/2))} \tag{34}$$

where:
the subscript, p, indicates values from a previous bit run
$t_{bp}$ = drilling time of previous bit
$H_1, H_2$ = constants based on bit class
$C_{1p}$ = composite constant defined as:

$$C_{1p} = \left[ \frac{(W/d_b)_m - W/d_b}{(W/d_b)_m - 4} \right] * (60/N)^{H_1} * (1/(1 + H_2/2)) \tag{34a}$$

$(W/d_{bm})$ = constant based on bit class

Bit Wear

An expression for the rate of bit wear, dw/dt, based on formation abrasiveness, rotary speed, weight on bit, and bit type is as follows:

$$dw/dt = 1/\tau_H * [N/60]^{H_1} * \frac{(W/\pi d^2)_m - 4}{(W/\pi d_b^2)_m - W/\pi d^2} * \frac{1 + H_2/2}{1 + (H_2 * w)} \tag{35}$$

where:
dw/dt = instantaneous rate of bit wear
$H_3$ = constant based on bit class

Bearing Wear

In an optional mode, the present invention incorporates an estimate of bearing wear as a limiting factor in calculating the incremental time and depth the bit in the borehole can be expected to drill.

A bearing wear relationship is as follows:

$$db/dt = 1/\tau_B (N/60)^{B_1} * (W/4d_b)^{B_2} \tag{36}$$

where:
$\tau_B$ = bearing wear constant
$B_1, B_2$ = bearing wear exponents
and:

$$t_b = C_3 * \tau_B * b_f \tag{37}$$

where:
$t_b$ = time to complete bearing wear
$C_3 = (60/N)^{B_1} * (4d/W)^{B_2} (37a)$
$b_f$ = final estimate of extent of bearing wear

Depth to Complete Bit Wear for Current Bit

The total depth to complete bit wear, corresponding to w = 1.0, is based on integrating a combination of the penetration rate model (Equation 1) and the instantaneous bit wear expression (Equation 35). The expression for depth to complete bit wear for the current bit, $\Delta D_{bc}$, is as follows:

$$\Delta D_{bc} = C_1 * C_2 * \tau_H * [(1 - e^{-a_4})/a_4 + (H_2(1 - e^{-a_4}) - a_4 e^{-a_4})/a_4^2] \tag{38}$$

where: $C_2$ = composite constant defined as:

$$C_2 = K * (\overline{W}/\pi d)^{a_1} * (\overline{N}/60)^{a_2} * (BH)^{a_3} * \exp(a_5(g_p) + a_6(g_p - \rho_E) + a_7(10{,}000 - D_{avg})) \tag{38a}$$

where: $D_{avg} = D_{initial} + \frac{1}{2}\Delta D_{bc}$

Because $D_{avg}$ is a function of $\Delta D_{bc}$, $\Delta D_{bc}$ is determined with an iterative solution.

The remaining interval to complete bit wear, $\Delta D_{rc}$, is the difference between the total depth to complete wear and the interval already drilled, $\Delta D_d$, as follows:

$$\Delta D_{rc} = \Delta D_{bc} - \Delta D_d \tag{39}$$

Time to Complete Wear for Current Bit

Equation 34 can be applied to the current bit and rearranged to solve for $t_{bc}$, the total time to complete bit wear, i.e., the time required to reach w = 1.0. This is calculated as follows:

$$t_{bc} = C_1 * \tau_H * (1 + H_2/2) \tag{40}$$

where: $C_1$ is based on values from the current bit

The remaining time to complete bit wear, $t_{rc}$, is the difference between the total time to wear and the current time, $t_{actual}$:

$$t_{rc} = t_{bc} - t_{actual} \tag{41}$$

Depth to Complete Wear for Replacement Bit

The depth to complete wear for a replacement bit, $\Delta D_{br}$, is based on Equation 38 when $w_f = 1.0$.

$$\Delta D_{br} = C_1 * C_2 * \tau_H * ((1 - e^{-a_7})/a_7) + H_2(1 - e^{-a_7} - a_7 e^{-a_7})/a_7^2 \tag{42}$$

Time to Complete Wear for Replacement Bit

Calculations for the time required by a replacement bit to drill to complete wear, $t_{br}$, begin with the following expression for the remaining depth to complete wear:

$$\Delta D_{rc} = C_1 * C_2 * \tau_H * ((1 - e^{-a_7 w})/a_7) + H_2(1 - e^{-a_7 w} - a_7 w * e^{-a_7 w})/a_7^2 \tag{43}$$

Given a value for $\Delta D_{rc}$, Equation 43 is solved for the extent of wear, w, of a replacement bit at $\Delta D_{rc}$ with an iterative procedure. The calculated value of w is a component of the following expression for the time for a replacement bit, $t_{rr}$, to drill the interval of interest:

$$t_{rr} = \tau_H * C_1(w + (H_2 * w^2)/2) \tag{44}$$

The total time required for a replacement bit to drill to complete wear, $t_{br}$, is also based on Equation 44 where w = 1.0:

$$t_{br} = \tau_H * C_1(1.0 + H_2/2) \tag{45}$$

Tripping Time

The time to make a trip includes pulling the drillstring and bottomhole assembly out of the hole, making the required changes, and replacing the entire assemblage in the hole. The present invention notes when drilling operations cease and, if verified by operating personnel, assigns this time to tripping operations. If unusual circumstances arise so that the total time spent tripping should not be properly allocated to tripping operations alone, the present method requests drilling personnel to estimate the time spent on actual tripping operations. If operators are unable to estimate actual tripping time, the present method uses an estimate for tripping time that is a function of depth.

The estimated tripping time for the replacement bit, $t_{tr}$, is based on the tripping time of the current bit, $t_{tc}$, as follows:

$$t_{tr} = (D_r/D_c) * t_{tc} \quad (46)$$

where:
$D_r$ = estimate of total depth that can be drilled by a replacement bit
$D_c$ = estimate of total depth that can be drilled by the current bit

F. Total Expected, Contoollable Unit Cost Calculations

The present method computes the total expected, controllable unit cost, E(unit/cost), for both the current bit and a replacement bit based on allocating future controllable cost components over a future drilling interval. The expected, controllable unit cost expression for the current bit includes bit costs and operating costs of the rig while the replacement bit expression incorporates bit costs, rig operating costs, and tripping costs. The expected, controllable unit costs of both bits are compared over the remaining interval that can be drilled by the current bit, $\Delta D_{rc}$.

A bit depreciation function, f(t), describes the manner in which the value of both current and replacement bits changes during drilling due to rotation in the hole. Bit depreciation is treated as a function of bit wear which is assumed to follow the model given in Equation 35. In the present method, depreciation of the bit can follow either an exponential or linear model. The exponential bit depreciation model assumes that the value of the bit decreases exponentially with rotating time, whereas the linear bit depreciation model assumes that bit depreciation is proportional to bit rotating time.

In the normal operating mode, the present method uses the exponential model for bit depreciation. However, operating personnel have the option to select the linear bit depreciation model if they believe it is a better approximation of the actual change in value of the bit. The expressions used for both methods are discussed as follows:

The general form of the bit depreciation expression is as follows:

$$C_{bs} = C_b * f(t) \quad (47)$$

where:
$C_{bs}$ = residual bit value
$C_b$ = initial bit cost
f(t) = bit depreciation function The exponential form of the bit depreciation function is as follows:

$$f(t) = a * e^{(-b*t)} \quad (48)$$

where:
t = rotating time of the bit
a = 1.0

$$b = (-A/t_b) * \ln(S/C_b) \quad (48b)$$

$t_b$ = total time required to drill to complete wear
S = bit salvage value at some specified degree of bit wear
1/A = ratio of rotating time to total rotating time at the specified degree of bit wear The linear form of the bit depreciation function is as follows:

$$f(t) = t_r/t_b \quad (49)$$

where: $t_r$ = time required to drill to a specified degree of wear

The residual value of a bit is a function of prevailing economic forces as well as the condition of the bit after drilling. The present method can allocate bit costs in a manner other than the exponential and linear models, if such methods are considered to be more closely approximate than the actual change in value of the bit.

Current Bit:

The total expected, controllable unit cost expression for the current bit is as follows:

$$E \text{ (unit cost)}_C = \frac{(C_{bc} * f(t_{rc})) + (C_r * t_{rc})}{\Delta D_{rc}} \quad (50)$$

where:
E(unit cost)$_c$ = expected unit cost of current bit
$C_{bc}$ = initial cost of current bit
f($t_{rc}$) = current bit depreciation function
$C_r$ = rig operating cost or customer charges per unit time
$t_{rc}$ = estimated time to complete bit wear for current bit
$\Delta D_{rc}$ = remaining interval that can be drilled with current bit

Bit Costs

The present method allocates bit costs over a future drilling interval in a manner approximating the actual change in value of the bit. In the normal operatng mode, an exponential depreciation pattern, given in Equation 48, is used to estimate the depreciation of the bit over the entire interval it is expected to drill, $\Delta D_r$. In an optional mode, operating personnel can select a linear bit depreciation model given in Equation 49.

Tripping Costs

Because tripping costs have already been incurred to install the current bit, they are not considered future costs and hence are not allocated over a future drilling interval.

Rig Operating Costs

The time required to drill the interval of interest, $t_{rc}$, is based on the specified degree of bit wear at $\Delta D_{rc}$ and is given by Equation 41.

Replacement Bit:

The total expected, controllable unit cost expression for a replacement bit is as follows:

$$E \text{ (unit cost)}_R = \tag{51}$$

$$\frac{(C_{br} * (1 - f(t_{rr})) + ((C_r * t_{tr}) * (D_{rc}/D_{br})) + (C_r * t_{rr})}{\Delta D_{rc}}$$

where:

$E(\text{unit cost})_R$ = expected unit cost of replacement bit
$C_{br}$ = initial cost of replacement bit
$f(t_{rr})$ = replacement bit depreciation function
$t_{tr}$ = estimated trip time for replacement bit
$\Delta D_{br}$ = total depth to complete wear for replacement bit
$t_{rr}$ = estimated time to $\Delta D_{rc}$ for replacement bit (from current depth)

Bit Costs

The bit costs of a replacement bit are prorated over the interval of interest using the same bit depreciation function applied to the current bit.

Tripping Costs

Tripping costs must be incurred at some time in the future in order to begin drilling with a replacement bit; hence they are included in the total expected, controllable unit cost expression for a replacement bit. The present method prorates tripping costs linearly over the interval of interest. It should be noted that other methods of prorating tripping costs could be used; however, the linear method is applied unless otherwise specified because the utility of tripping costs is assumed to extend uniformly over the entire interval that can be drilled.

Operating Costs

The time to drill $\Delta D_{rc}$ for the replacement bit, $t_{rr}$, is calculated with Equation 44. Because the replacement bit can drill the interval $\Delta D_{rc}$ faster than the current bit, $t_{rr}$ is less than $t_{rc}$.

G. Output of the Model

The output of the present program is a decision to continue drilling with the bit currently in the borehole or to replace it with a new bit. The output of the program consists of a message in a terminal to the effect that "A bit change is recommended at the following depth: ". While the present method performs many real-time computations that are not displayed in the normal operating mode, a graphical comparison of the expected, controllable unit costs of both bits such as given in FIG. 2 is continuously available to operating personnel.

In the normal operating mode, the replacement bit is assumed to be new. As such, the replacement bit is relatively undulled during the initial stages of drilling and thus is capable of drilling faster than the current bit. As shown in FIG. 2 the total expected, controllable unit cost of a replacement bit declines as the future interval of analysis, $\Delta D_{rc}$, declines because the average penetration rate is higher. Because the higher penetration rate reduces the time required to drill the interval, the rig operating costs that must be allocated to the interval are lower.

In the normal operating mode, the replacement bit decision is continuously made based on the expected, controllable unit cost calculations as previously described; however, there are options available to drilling personnel who wish to expand the scope of the present method and they are discussed as follows:

Different Interval of Analysis

In the normal operating mode, the present method compares the total expected, controllable unit costs of the current bit and a replacement bit over the entire future interval that can be drilled with the current bit, $\Delta D_{rc}$; however, operating personnel have the option to request a bit replacement decision based on any lesser interval of their choice. In this option, the present method calculates the degree of wear at the specified depth and uses this value of w to calculate the time, $t_{rr}$, required to drill to the given depth.

Adjustment of Bit Costs to Reflect Salvage Value

Using the initial costs of the current bit and a replacement bit for $C_{bc}$ and $C_{br}$ respectively will yield a valid relative comparison of the expected, controllable unit costs; however, drilling personnel can estimate the residual or salvage value of either bit in order to more closely approximate "true" future controllable costs. If this option is selected, the present method subtracts the salvage value from the initial bit costs to reflect net bit costs which are taken as the bit value to be prorated over a future drilling interval.

Effects of Formation Simulation on Bit Replacement Decision

Operating personnel can also examine the replacement bit decision based on expected, controllable unit costs from previous formations in the well being drilled or from similar formations encountered in offset wells.

If operating personnel expect to encounter a formation similar to one drilled previously, they can request a bit replacement decision based on penetration rate data from the interval already drilled. For example, if the bit is at 9,400 feet and operating personnel wish to examine the bit replacement decision based on a smmulation for a similar formation that was encountered between 6,780 and 6,905, they only have to input these two depths. The present method will automatically combine the current values of drilling variables with the parameters $a_1$ to $a_7$ from the previous interval and generate a bit replacement decision. Several options of this type are available to operating personnel who can examine the bit replacement decision based on a selective combination of variables and parameters from different drilling intervals.

Having described the present method in terms of various Equations and expressions evaluated for optimizing drilling costs on a real-time basis, a summary of the method steps illustrated in FIG. 4 will now be provided.

The present method acquires data on a real-time basis through a data acquisition system for obtaining drilling operating variables including: drilling depth, time, rate of penetration of the bit, weight on the bit, rotary speed of the bit, "D" exponent, stand pipe pressure, annulus pressure and mud density. Systems that monitor and provide this data include Visulogger manufactured and sold by TOTCO; DATA-SENTRY manufactured and sold by Geolograph/Pioneer and Data Star manufactured and sold by Magcobar/Dresser Industries. The values of real-time drilling operating variables obtained through the aforementioned data acquisition systems are stored in direct access data files of the software of the present invention.

Additionally, real-time mud and bit values are accessed on a real-time basis or from previously stored values in a data file of the software of the present invention. These mud properties are generally acquired manually and entered into a data acquisition system for use on a real-time basis. Mud or drilling fluid variables include the following: density of the cuttings, diameter of the cuttings, mud rotational viscometer readings, apparent viscosity of the drilling fluid, yield point of the drilling fluid, mud consistency index, and the mud flow behavior index. A calculated value of the equivalent circulating density of the drilling fluid can be determined from the preceeding data and certain additional well information.

The present method quantifies the sensitivity of the penetration rate to individual operating variables exclusive of lithology functions. This is accomplished by using transition point analysis, a technique that generates real-time parameters which are either exponents or coefficients for the real-time variables in a multivariate penetration rate model. The parameters are calculated by identifying successive intervals of depth or time wherein one or more of the variables comprising a penetration rate model changes and generates a contemporaneous change in the penetration rate.

Transition point analysis is used to calculate parameters $a_1$, $a_2$, $a_3$, $a_5$, and $a_6$ using Equations 28–32. Regression analysis is applied to calculate parameters $a_4$ and $a_7$.

In the application of transition point analysis, the first penetration rate expression based on the first data set is divided by the second penetration rate expression based on the second data set. By definition, all terms in the penetration rate expression other than the variable that has been observed to change remain constant. The constant terms are eliminated from both penetration rate expressions, and a solution based on the logarithm of the remaining terms is established. In the numerator of the remaining expression, the first penetration rate value is divided by the second penetration rate value and the log of the resulting term is taken. In the denominator or the remaining expression, the first value of the variable of interest is divided by the second value of the same variable and the log of the resulting term is taken. Dividing the numerator by the denominator yields a parameter value for the variable of interest.

If more than one variable changes at a given transition point, the penetration rate model is normalized for the effects of one of the variables prior to calculating a parameter for the variable of interest. The normalization procedure, (Equations 30 and 31), consists of dividing the penetration rate value at both points of interest by the variable and corresponding parameter not to be calculated. The normalized penetration rate values are substituted for the penetration rate values in the numerator of Equation 29 used to calculate the parameter of interest.

Software for carrying out the present invention smoothes the effects of different types of lithology on the parameter values by retrieving previously stored values of parameters and calculating average values of these parameters using Equation 32. The average values are determined by dividing the sum of all values calculated for the parameters of interest by the number of observations recorded for each parameter over the interval of the evaluation.

The average values of selected operating variables are calculated using Equation 33. These average values are computed by dividing the sum of the values of each of the operating variables of interest by the number of observations of each variable recorded over the interval of interest.

The formation drillability factor, K, which is based on real-time data acquired during a specified drilling interval, is calculated using Equation 20. The formation drillability factor is calculated by dividing the sum of all real-time penetration rate values observed over the interval of interest by the sum of all terms in the penetration rate expressions corresponiing to each of the observed penetration rate values. Alternatively, K can be calculated with a regression procedure.

The formation abrasiveness is calculated using Equation 34. The abrasiveness is calculated by dividing the time required to drill the formation of interest by a term that incorporates values of selected real-time operating variables, bit constants and a value of bit wear.

The process of the present invention continues by formulating a real-time, predictive penetration rate expressoon such as given by Equation 1. For a specified set of real-time data, the penetration rate expression describes observed values of the penetration rate of a bit in terms of a multivariate mathematical expression which includes the previously defined parameters and variables.

An important asect of the present invention is the ability of the present method to estimate future values of the penetration rate of a drill bit by extrapolating a real-time penetration rate expression over a future drilling interval. The extrapolation, used to calculate the PRE statistic, for example, utilizes average values oft- the controllable operating variables and successively incremented values of the non-controllable variables. By iteratively solving a multivariate, predictive penetration rate expression such as Equation 1, together with a bit wear expression such as Equation 35, the penetration rate expression can generate expected penetration rate values over a future drilling interval. As previously described, FIG. 1 depicts an extrapolation of the penetration rate expression.

As previously stated, the present invention quantifies the accuracy of a real-time, predictive penetration rate expression. The next step in the process of the present invention is to calculate a predictive statistic, PRE, using Equation 18. A PRE score is calculated over an interval represented by the difference between the total number of observed penetration rate values and the minimum number of observations required to establish predictive penetration rate values. The square root of the sum of the squared differences between observed penetration rate values and predicted penetration rate values is taken over the interval previously defined. The resulting square root term is divided by the number of observations in the interval previously defined. The predictive ability of the penetration rate expression is then assessed on the basis of the calculated PRE score.

Limits of the predictive statistic are correlated with intervals of sufficient agreement between predicted and observed values of the penetration rate. Values of the predictive statistic that exceed specified limits provide an output to temporarily suspend bit replacement recommendations to drilling personnel.

Using Equation 19, the variable contributions to the predictive capacity of the penetration rate model are quantified. The variables are sequentially incorporated in the penetration rate model and a predictive statistic based on some interval of interest is calculated. The difference between the predictive statistic calculated following the addition of a given variable and the predictive statistic obtained just prior to the inclusion of the variable in the penetration rate model represents the contribution of the variable to the predictive ability of the model.

Differentiation among variables describing similar mechanisms is then performed. The variable of interest is incorporated in a predictive penetration rate model such as Equation 1. If a predictive statistic based on the revised penetration rate model consistently declines over multiple intervals of evaluation, the variable of interest is included in the predictive penetration rate model as an additional variable or is substituted for a variable representing the same drilling mechanism and previously incorporated in the penetration rate model.

If multiple penetration rate models are available, differentiation among said penetration rate models is then performed by comparing the predictive statistic of each penetration rate model as computed with the same real-time drilling data set. The penetration rate model that yields the lowest predictive statistic is identified as the best predictive expression and is selected for subsequent calculations requiring a predictive penetration rate model. Hence, the predictive penetration rate model used in this invention is not limited to Equation 1.

The software continues in the process of the present method to determine if abnormally pressured formations are encountered. The method uses Equation 23 to compute comprehensive normalized penetration rate values by dividing the observed penetration rate values by all terms in the penetration rate expression except the terms that include a formation pore pressure value. The comprehensive normalized penetration rate values are computed over some interval of interest and compare with the predicted residual error scores over the same interval. When both indices increase simultaneously, the interval is indentified as possibly including an abnormally pressured formation.

The present method further determines the beginning of an abnormally pressured subsurface formation by combining first order and second order expressions. Using an iterative fashion, the comprehensive normalized penetration rate data in the interval of interest are sequentially incorporated in a second order expression. The method computes the variance represented by the sum of the absolute difference between the calculated values in both the first and second order expressions and the actual comprehensive normalized penetration rate values. The data set with the minimum total variance is identified as the optimal combination, and the intersection of the first order and second order curves is identified as the beginning of the abnormally pressured formation. (See FIG. 3).

The software of the present invention then calculates the composite constants $C_1$ and $C_2$ as defined in connection with Equations 34(a) and 38(a). The total depth to complete bit wear for the current bit is then calculated using Equation 38. The remaining depth to complete bit wear for the current bit is calculated with Equation 39.

The total time to complete bit wear for the current bit is calculated using Equation 40. The remaining time to complete bit wear for the current bit is calculated using Equation 41.

The total depth to complete bit wear for a replacement bit is calculated using Equation 42. The time to complete bit wear for a replacement bit is based on Equation 43 which determines the extent of wear of a replacement bit at the depth that can be drilled by the current bit. The time required for a replacement bit to drill the interval that can be drilled by the current bit is calculated using Eqution 44. The total time required for a replacement bit to drill to complete wear is calculated using Equation 45.

In an optional mode, the values of depth and time for both the current bit and a replacement bit can be based on bit bearing wear as opposed to the surface wear of the bit. This procedure, which is given by Equations 36 and 37, is based on subjective estimates of the real-time extent of bit bearing wear.

A bit depreciation function representing the real-time change in the monetary value of a bit is calculated using the software of the present invention by evaluating Equations 47-49. The bit depreciation function applies to both the current bit in the borehole as well as a replacement bit and can be extrapolated over a future drilling interval to determine the amount of bit-related costs required to drill the interval.

The present invention provides for a real-time method for estimating the expected, controllable unit drilling costs over a future drilling interval by using Equation 50 for the current bit and Equation 51 for a replacement bit. The expected, controllable unit cost for the current bit incorporates controllable cost components including future drill bit costs and future drilling rig operating costs (or drilling rates charged to customers) and divides the sum of these costs by a specified future drilling interval up to and including the remaining depth to complete drill bit wear. The expected, controllable unit cost equation for a replacement bit incorporates future bit costs and drilling rig operating costs in addition to tripping costs that are considered controllable for a replacement bit. For the replacement bit, bit costs are allocated according to the bit depreciation function previously described while tripping costs are allocated in a linear manner.

The output of the present program is a decision to continue drilling with the bit currently in the hole or to replace it with a new bit with the same or comparable performance characteristics. In an optional mode, a decision to continue drilling with the current bit or to install a partially worn replacement bit could be generated if drilling personnel quantify the extent of wear of the replacement bit.

Therefore, it can be seen that the present method directly compares the expected, controllable unit cost of the current bit in the borehole and a replacement bit over a future interval of depth that can be drilled with the current bit and determines which bit will generate lower unit drilling costs.

The present method includes a real-time, multivariate predictive penetration rate model which incorporates variables and parameters that uniquely describe the penetration rate pattern of a drill bit. The method describes a predictive variance statistic which determines the significance of each variable in the penetration rate model, evaluates the predictive ability of the model, quantifies data quality and evaluates new variables for possible inclusion in the penetration rate model. Based upon the selected real-time, predictive penetration rate model, the present method projects the incremental depth and time the current bit in the borehole can drill and calculates the total expected, controllable unit cost over this future drilling interval.

The present method also calculates the total expected, controllable unit cost for a replacement bit over the interval that can be drilled by the current bit. Hence, the present method permits the total, expected, controllable unit costs of the current bit and a replacement bit to be directly compared over the same interval of analysis.

A computer software program for accomplishing the present method is attached hereto as an appendix.

Whereas the present invention has been described with respect to specific embodiments thereof, it will be understood that various changes and modifications will be suggested to one skilled in the art and it is intended to encompass such changes and modifications as fall within the scope of the appended claims.

APPENDIX

METHOD FOR DETERMINING ECONOMIC DRILL BIT UTILIZATION

```
C
C
C
C
C
C
C
C
C
C
C
C  PROGRAM FOR DETERMINATION OF OPTIMUM DEPTH TO CHANGE BIT
C  GIVEN THE OBJECTIVE OF OPTIMIZING ECONOMICS.
C
C  PENETRATION RATE ASSUMED TO BE A FUNCTION OF:
C   *  ROTARY SPEED
C   *  WEIGHT ON BIT
C   *  BIT HORSEPOWER
C   *  DEPTH
C   *  PRESSURE OVERBALANCE
C   *  FORMATION POREPRESSURE
C   *  BIT TYPE
C  EFFECT OF FORMATION TYPE AVERAGED OUT AND CAPTURED IN K PARAMETER
C
C  IN THIS APPLICATION THE FOLLOWING PARAMETERS ARE ASSUMED TO
C  REMAIN CONSTANT AT CURRENT VALUES (DEFAULT) OR AT USER SPECIFIED
C  VALUES:
C   *  ROTARY SPEED
C   *  WEIGHT ON BIT
C   *  BIT HORSEPOWER
C   *  PRESSURE OVERBALANCE
C   *  FORMATION POREPRESSURE
C   *  BIT TYPE AND FORMATION ABBRASIVENESS
C
C  NOMENCLATURE:
C  N1,N2,N3 - BIT CLASSIFICATION NUMBERS
C  MTYP - MUD TYPE TRACER
C  H1,H2 - TOOTH WEAR PARAMETERS
C  B1,B2 - BEARING WEAR PARAMETERS
C  WDMAX - MAXIMUM BIT WEIGHT (KLB/IN)
C  DAVG - AVERAGE DRILLING DEPTH (FT)
C  GP - PORE PRESSURE GRADIENT (PPG)
C  ECD - EQUIVALENT CIRCULATING DENSITY (PPG)
C  HPB - BIT HORSEPOWER (HP)
C  CB - BIT COST ($)
C  CR - RIG COST ($)
C  TT - TRIP TIME (HRS)
C  TC - CONNECTION TIME (MIN/STAND)
C  SL - LENGTH OF STAND (FT)
C  A1,A2,A3,A4,A5,A6,A7 - PEN.RAT.EQN.PARAMETERS
C  AB - BIT AREA (SQ.IN.)
C  TAUH - FORMATION ABBRASIVENESS (HRS)
C  TAUB - BEARING WEAR CONSTANT (HRS)
C  XK - FORMATION DRILLABILITY (FT/HR)
C  XN - ROTARY SPEED (RPM)
C  WD - BIT WEIGHT (KLB/IN)
C  XNMIN - POSITION OF FIRST ROW
C  WDMIN -  ,,   ,,   ,,   ,,    COLUMN
C  XJ2 - GROUP OF VARIABLES IN TOOTH WEAR EQN.
C  XJ3 - GROUP OF VARIABLES IN BEARING WEAR EQN.
```

```
C    XJ1 - GROUP OF VARIABLES IN PEN. RATE EQN.
C    I,J - LOOP TRACERS
C    NN - LAST COLUMN INDICATOR
C    RAT - PENETRATION RATE (FT/HR)
C    DP - FOOTAGE TO DATE ON OLD BIT (FT)
C    TOP - PRESENT TIME FOR OLD BIT (HRS)
C
      DIMENSION DP(50),CPFO(50),CPFN(50)
      CHARACTER M
$DEBUG
C
C
C
C
C    OPEN FILE WITH DRILLING DATA
      OPEN(1,FILE='DRLDAT',STATUS='OLD')
    2 CONTINUE
      READ(1,4)N1,N2,N3
    4 FORMAT(3I2)
      READ(1,10)MTYP
   10 FORMAT(I2)
C       READ(1,15)DP(1),TOP
C   15 FORMAT(F7.1,F7.2)
      READ(1,21)DAVG,GP,ECD,HPB
   21 FORMAT(F9.2,F6.3,F6.3,F8.2)
      READ(1,23)DB,F1MAX,WDT
   23 FORMAT(3F7.4)
      READ(1,24)A7,A5,A6,A1,A2,A4,A3
   24 FORMAT(7F10.7)
      A4=.8
      READ(1,25)CB,CR,TT,TCM,SL,TOP,DP(1),S
   25 FORMAT(2F9.1,2F6.1,F5.1,F7.4,F7.1,F9.2)
      WRITE(*,26)DB,N1,N2,N3
   26 FORMAT(1X,'Do you plan to use a bit different from a
     *',F7.4,' in. class ',3I2,' bit? (Y/N)')
      READ(*,52)M
      IF(M.EQ.'N')THEN
      NN1=N1
      NN2=N2
      NN3=N3
      DBN=DB
      ELSE
      WRITE(*,*)'Enter new bit class (f.e. 1,3,2) and new bit
     *diameter (in.)'
      READ(*,27)NN1,NN2,NN3,DBN
      ENDIF
      CALL BTCLS(N1,N2,N3,MTYP,H1,H2,WDMAX,B1,B2)
      CALL BTCLS(NN1,NN2,NN3,MTYP,HN1,HN2,WDNMAX,BN1,BN2)
   27 FORMAT(3I2,F7.4)
      CALL OFSET(X,TAOH,TAOB,XK)
      IF(MTYP.EQ.1)M='BARITE MUD'
      IF(MTYP.EQ.2)M='SULFIDE MUD'
      IF(MTYP.EQ.3)M='WATER
      IF(MTYP.EQ.4)M='CLAY/WATER MUD'
      IF(MTYP.EQ.5)M='OIL-BASED MUD'
      WRITE(*,28)M
   28 FORMAT(1X,A)
      WRITE(*,29)DAVG
   29 FORMAT(1X,'Average Depth: ',F7.1,' ft')
      WRITE(*,30)GP
   30 FORMAT(1X,'Pore Pressure Gradient: ',F4.1,' ppg')
      WRITE(*,31)ECD
   31 FORMAT(1X,'Equiv. Circ. Density: ',F4.1,' ppg')
      WRITE(*,32)HPB
   32 FORMAT(1X,'Bit HP: ',F7.1,' HP')
      WRITE(*,33)
```

```
   33 FORMAT(1X,'Parameters : a7',8X,'a5',8X,'a6',8X,'a1',8X,
     *'a2',8X,'a4',8X,'a3')
      WRITE(*,34)A7,A5,A6,A1,A2,A4,A3
   34 FORMAT(10X,7(2X,F10.8))
      WRITE(*,35)CR
   35 FORMAT(1X,'Rig Cost :',F9.2,' $/hr')
      WRITE(*,36)CB
   36 FORMAT(1X,'Bit Cost :',F9.2,' $')
      WRITE(*,37)TT
   37 FORMAT(1X,'Trip Time :',F7.4,' hrs')
      WRITE(*,38)TC
   38 FORMAT(1X,'Conection Time :',F5.1,' min/stand')
      WRITE(*,39)SL
   39 FORMAT(1X,'Stand Length :',F5.1,' ft')
      WRITE(*,40)TAOH
   40 FORMAT(1X,'Abbrasiveness Constant (TaoH) :',F6.2,' hrs')
      WRITE(*,41)TAOB
   41 FORMAT(1X,'Bearing Wear Constant (TaoB) :',F6.2,' hrs')
      WRITE(*,42)XK
   42 FORMAT(1X,'Formation Drillability (K) :',F6.2,' ft/hr')
      WRITE(*,43)DB,DBN
   43 FORMAT(1X,'Bit Diameters OLD:',F6.3,' in. and NEW',F6.3,' in.')
      WRITE(*,50)N1,N2,N3
      WRITE(*,51)NN1,NN2,NN3
      WRITE(*,44)F1MAX
   44 FORMAT(1X,'F1max :',F6.3)
      WRITE(*,45)WDT
   45 FORMAT(1X,'Threshhold Bit wt. :',F7.3,' klb/in')
   50 FORMAT(1X,'OLD bit class',I4,' ',I4,' ',I4)
   51 FORMAT(1X,'NEW bit class',I4,' ',I4,' ',I4)
   52 FORMAT(A)
      READ(1,60)XN,WD [NOTE: OPTION TO USE PRESENT OR FICTITIOUS VALUE
   60 FORMAT(F6.2,F7.2)
      XN=60.
      WD=5.
C
C  DO THESE CALCULATIONS FOR PRESENT DEPTH AND FOR FUTURE DEPTHS
C  UP TO PRESENT DEPTH + 800 FT
C
      DO 110 I=1,40
C  CALCULATE TIME AND DEPTH DRILLED WITH OLD BIT
      XJ2=(WDMAX-WD)/(WDMAX-4.)*(60/XN)**H1/(1.+H2/2.)
      XJ3=(60./XN)**B1*(4./WD)**B2
      TBC=TAOH*XJ2*(1.+H2/2.)
      TB2=TAOB*XJ3
      IF(TBC.GT.TB2)THEN
      TBC=TB2
      BF=1.
      HF=((1./H2)**2.+2.*TBC/(H2*XJ2*TAOH))**.5-1/H2
      ELSE
      HF=1.
      BF=TBC/(TAOB*XJ3)
      ENDIF
C
C  CALC. DRILLED DEPTH PREDICTION
      F1=((WD-WDT)/(4.-WDT))**A1
      IF(F1.GT.F1MAX)F1=F1MAX
      F2=(XN/60)**A2
      AB=3.142*DB**2/4.
      F3=(HPB/(3.*AB))**A3
      F5=EXP(2.303*A5*DAVG*.69*(GP-9.0))
      F6=EXP(2.303*A6*DAVG*(GP-ECD))
      F7=EXP(2.303*A7*(10000-DAVG))
      XJ1=XK*F1*F2*F3*F5*F6*F7
      Y=EXP(-A4*HF)
```

```
      DBC=XJ1*XJ2*TAOH*((1.-Y)/A4+H2*(1.-Y-A4*HF*Y)/A4**2)
      DRC=DBC-DP(I)
      TRC=TBC-TOP
C
C   CALCULATE TIME AND DEPTH DRILLED WITH NEW BIT
      XJ2=(WDNMAX-WD)/(WDNMAX-4.)*(60/XN)**HN1/(1.+HN2/2.)
      XJ3=(60./XN)**BN1*(4./WD)**BN2
      TBR=TAOH*XJ2*(1.+HN2/2.)
      TB2=TAOB*XJ3
      IF(TBN.GT.TB2)THEN
      TBR=TB2
      BF=1.
      HF=((1./H2)**2.+2.*TBN/(H2*XJ2*TAOH))**.5-1/H2
      ELSE
      HF=1.
      BF=TBR/(TAOB*XJ3)
      ENDIF
C
      F7=EXP(2.303*A7*(10000-DAVG))
      F5=EXP(2.303*A5*DAVG*.69*(GP-9.0))
      F6=EXP(2.303*A6*DAVG*(GP-ECD))
      F1=((WD-WDT)/(4.-WDT))**A1
      IF(F1.GT.F1MAX)F1=F1MAX
      F2=(XN/60)**A2
      AB=3.142*DB**2/4.
      F3=(HFB/(3.*AB))**A3
      XJ1=XK*F1*F2*F3*F5*F6*F7
      Y=EXP(-A4*HF)
      DBR=XJ1*XJ2*TAOH*((1.-Y)/A4+H2*(1.-Y-A4*HF*Y)/A4**2)
C
C   CALC. TIME FOR NEW BIT TO DRILL DRC
      AB=3.142*DBN**2/4.
      F3=(HFB/(3.*AB))**A3
      XJ1=XK*F2*F3*F4*F5*F6*F8
      DLT=HF
      Y=EXP(-A4*HF)
      DN1=XJ1*XJ2*TAOH*((1.-Y)/A4+H2*(1.-Y-A4*HF*Y)/A4**2)
  100 Y=EXP(-A4*HF)
      DRR=XJ1*XJ2*TAOH*((1.-Y)/A4+H2*(1.-Y-A4*HF*Y)/A4**2)
      IF(ABS(DRR-DRC).GT.1.)THEN
      IF(DRR.GT.DRC)THEN
      HF=HF-DLT
      ELSE
      HF=HF+DLT
      ENDIF
      DLT=DLT/2.
      GOTO 100
      ELSE
      CONTINUE
      ENDIF
      TRR=TAOH*XJ2*(HF+H2*HF**2/2.)
C
C   CALC. COST PER FOOT
      TC=TCM/60.*DD/SL
C    ESTIMATE RESIDUAL BIT VALUE
      B=-2.*LOG(S/CB)/TBC
      FT=EXP(-B*TOP)
      CPFO(I)=(CR*(TC+TRC)+CB*FT)/DRC
      B=-2.*LOG(S/CB)/TBR
      FT=EXP(-B*TRR)
      TTA=TT*DRR/DBR
      CPFN(I)=(CB*(1.-FT)+CR*(TTA+TC+TRR))/DRC
      IF(CPFO(I).GT.CPFN(I))THEN
C  CHANGE BIT MESSAGE
      ELSE
      CONTINUE
      ENDIF
```

```fortran
      DP(I+1)=DP(I)+5.
      IF(DP(I+1).GE.DP(I)+DRC-1.)GOTO 120
      DLT=1.
  105 Y=EXP(-A4*HF)
      DDN=XJ1*XJ2*TAOH*((1.-Y)/A4+H2*(1.-Y-A4*HF*Y)/A4**2)
      IF(ABS(DDN-DP(I+1)).GT.1.)THEN
      IF(DDN.GT.DP(I+1))THEN
      HF=HF-DLT
      ELSE
      HF=HF+DLT
      ENDIF
      DLT=DLT/2.
      GOTO 105
      ELSE
      CONTINUE
      ENDIF
      TOP=TAOH*XJ2*(HF+H2*HF**2/2.)
  110 CONTINUE
  120 CONTINUE
      NPT=I-1
      DMIN=1.E10
      CMIN=1.E10
      DMAX=0.
      CMAX=0.
      DO 130 I=1,NPT
      WRITE(*,*)'I,D,CO,CN',I,DP(I),CPFO(I),CPFN(I)
      IF(DP(I).LE.0.)GO TO 125
      IF(DP(I).LT.DMIN)DMIN=DP(I)
      IF(DP(I).GT.DMAX)DMAX=DP(I)
      IF(CPFO(I).LT.CMIN)CMIN=CPFO(I)
      IF(CPFO(I).GT.CMAX)CMAX=CPFO(I)
      IF(CPFN(I).LT.CMIN)CMIN=CPFN(I)
      IF(CPFN(I).GT.CMAX)CMAX=CPFN(I)
  125 CONTINUE
  130 CONTINUE
      CALL PLTDATA(DP,CPFO,CPFN,DMIN,DMAX,CMIN,CMAX,NPT)
      STOP
      END
C  SUBROUTINE FOR RETRIEVING OF BIT CLASS DATA
      SUBROUTINE BTCLS(N1,N2,N3,MTYP,H1,H2,WDMAX,B1,B2)
C  RETRIEVE BIT CLASS DATA FROM DIRECT ACCESS FILE BTCLS
      OPEN(2,FILE='BTCLS',STATUS='OLD',ACCESS='DIRECT',RECL=107)
      I=(N1-1)*12+(N2-1)*3+1
      WRITE(*,5)I,N1,N2,N3
    5 FORMAT(1X,I4,' ',I4,' ',I4,' ',I4)
      READ(2,REC=I)H1
      I=I+1
      READ(2,REC=I)H2
      I=I+1
      READ(2,REC=I)WDMAX
      I=96+N3
      READ(2,REC=I)B1
      IF(N3.EQ.1)N3=N3+MTYP+2
      I=99+N3
      READ(2,REC=I)B2
      CLOSE(2)
      RETURN
      END
C  SUBROUTINE FOR EVALUATION OF OFFSET BIT RUN DATA
C  FOR DETERMINATION OF ABBRASIVENESS CONSTANTS AND
C  DRILLABILITY CONSTANT.
      SUBROUTINE OFSET(X,TAOH,TAOB,XK)
      WRITE(*,10)
C
C
   10 FORMAT(1X,'ENTER OFFSET BIT LIFE(HRS),WT ON BIT(LBS),ROT SPEED(R
```

```
      *,OFFSET BIT DIAM')
        READ(1,20)X1
        READ(1,20)W
        READ(1,20)X3
        READ(1,20)DB
   20 FORMAT(F9.4)
        TB=X1
        XN=X3
        WD=W/DB
        WRITE(*,30)
   30 FORMAT(1X,'ENTER DRILLED DEPTH, FRACTION TOOTH WEAR, FRACTION
      *BEARING WEAR')
        READ(1,40)DD
        READ(1,41)X6
        READ(1,41)X7
        HF=X6
        BF=X7
   40 FORMAT(F7.1)
   41 FORMAT(F7.4)
        WRITE(*,3)
    3 FORMAT(1X,'ENTER BIT CLASS (F.E. 1 3 2)')
        READ(1,50)N1,N2,N3
   50 FORMAT(3I2)
        WRITE(*,5)
        READ(1,60)MTYP
    5 FORMAT(1X,'ENTER MUD TYPE')
   60 FORMAT(I2)
        CALL BTCLS(N1,N2,N3,MTYP,H1,H2,WDMAX,B1,B2)
        XJ2=(WDMAX-WD)/(WDMAX-4.)*(60./XN)**H1*(1./(1.+H2/2.))
        TAOH=TB/XJ2/(HF+H2*HF**2./2.)
        TAOB=(XN/60.)**B1*(WD/4.)**B2*TB/BF
   70 CONTINUE
        RAT=DD/TB
        WRITE(*,80)
   80 FORMAT(1X,'ENTER AVG DEPTH,ECD,GP, BIT HP,TRESHHOLD WB,F1MAX')
        READ(1,90)DAVG,ECD,GP,HPB,WBT,F1MAX
   90 FORMAT(F7.1,2F5.2,F7.1,F6.2,F5.2)
        WRITE(*,100)
  100 FORMAT(1X,'ENTER A7,A5,A6,A1,A2,A4,A3')
        READ(1,110)A7,A5,A6,A1,A2,A4,A3
  110 FORMAT(7F9.7)
        AB=3.1415926*DB**2./4.
        F1=((WD-WDT)/(4.-WDT))**A1
        IF(F1.GT.F1MAX)F1=F1MAX
        F2=(XN/60)**A2
        F3=(HPB/(3.*AB))**A3
        F4=EXP(-A4*HF)
        F5=EXP(2.303*A5*DAVG*.69*(GP-9.0))
        F6=EXP(2.303*A6*DAVG*(GP-ECD))
        F7=EXP(2.303*A7*(10000.-DAVG))
        XK=RAT/(F1*F2*F3*F4*F5*F6*F7)
        RETURN
        END
C
C
        SUBROUTINE FLTDATA(X,Y,Z,XMIN,XMAX,YMIN,YMAX,NPT)
$nodebug
$storage:2
        dimension x(50),y(50),z(50)
        character char
        common/zzdata/pi,range,factor
c  Clear the screen and initialize.
        mode=6
        call qsmoe(mode)
c  Move text cursor to top left corner.
        call qcmov(0,24)
C
C
```

```
c   Color definitions for color graphics.
c   Set background color for graphics
          iback=4
          ipall=0
          call qcolor(iback,ipall)
c   Set up the graphics window on the screen.
          jcol1=110
          jcol2=509
          jrow1=10
          jrow2=189
c   Define limiting values of x and of y to correspond to extremes
c   of the above graphics window.
          XMX=XMAX+(XMAX-XMIN)/4.
          XMN=XMIN-(XMAX-XMIN)/4.
          YMX=YMAX+(YMAX-YMIN)/4.
          YMN=YMIN-(YMAX-YMIN)/4.
c   Define point where axes will cross.  In this case, it is the
c   same as the plot origin, but need not be there.
          xorg=XMIN-(XMAX-XMIN)/20.
          yorg=YMIN-(YMAX-YMIN)/20.
c   Use screen aspect ratio in setting maximum value of y in
c   graphics window.  Note the plot can extend outside of your
c   graphics window.  However, you will have problems if its
c   off the screen.
          iopt=1
c   Define starting and ending values of x and of y for the axes.
          xst=XORG
          xfin=XMAX
          yst=YORG
          yfin=YMAX
c   Define spacing between tic marks on the axes.
          xmaj=(xmax-xmin)/4.
          ymaj=(ymax-ymin)/4
c      Set x and y axis tic mark label options:
c      minor tic marks; auto-label on; format f10.2
          minor=1
          label=1
          ndec=1
c
c   Assumed maximum value of y at top of graphics window.
c   Plot initialization step.  Check value of iopt on exit to
c   make sure the plot will fit into the specified window.
          call qplot(jcol1,jcol2,jrow1,jrow2,xmn,xmx,ymn,ymx,
      1   xorg,yorg,iopt,1.,1.)
          if(iopt.ge.0) go to 101
          if(iopt.eq.-2)    stop
c   Draw the axes.  Put in the tic marks.  Note the axes are
c   well within the graphics window.
c
  101     call qxaxis(xst,xfin,xmaj,minor,label,ndec)
          call qyaxis(yst,yfin,ymaj,minor,label,ndec)
      1   continue
c   Place text (here just single characters) on the plot.
  100     format(I2)
  110     format(I3)
          kolor=2
          char='x'
          nchar=1
          call qptxb(nchar,char,kolor)
          char='y'
          nchar=1
          call qptxc(nchar,char,kolor)
          a=xst
          b=xfin
          CLOSE(3)
c
```

```
c   Draw the curve on the same plot.
        call qtabl (1,npt,x,y)
        call qtabl (1,npt,x,z)
        WRITE(*,701)
701     format(' type any '/' char to '/' terminate')
        read(*,999) char
999     format(a)
        call qpclr
        call qclear (0,7)
111     continue
        end
c$$$$$$$$$$$$$$$$$$$$$$$$$$$$$$$$$$$$$$$$$$$$$$$$$$$$$$$$$$$$$$$$$$$$
c$$$$$$$$$$$$$$$$$$$$$$$$$$$$$$$$$$$$$$$$$$$$$$$$$$$$$$$$$$$$$$$$$$$$
c
c       functions defining test parametric curve
c
c$$$$$$$$$$$$$$$$$$$$$$$$$$$$$$$$$$$$$$$$$$$$$$$$$$$$$$$$$$$$$$$$$$$$
c$$$$$$$$$$$$$$$$$$$$$$$$$$$$$$$$$$$$$$$$$$$$$$$$$$$$$$$$$$$$$$$$$$$$

real function xfun(t)
c*      sample function for testing procedure qcurv xfun = t end c$$$$$$$$$$$$$$$$$$$$$$$$$$$$$$$$$$$$$$$$$$$$$$$$$$$$$$$$$$$$$$$$$$$$

real function yfun(t)
c*      sample function for testing procedure qcurv
        common/zzdata/pi,range,factor
        xx=abs(t)
        yfun= exp(-xx/range)*cos(pi*factor*t)
        return
        end
c
c
        real function yfun1(t)
c       Second sample function. Note that the algorithm takes
c       longer to plot a discontinuous function. Avoid jumps
c       in the function, if possible.
        xx=amod(t,0.4)
        yfun1= -1.0 +abs(xx)
        return
        end
```

```
c
c
c
c       ******************************************
c       *                                        *
c       *    Drilling Data  Evaluation and       *
c       *          Processing Software           *
c       *                                        *
c       ******************************************
c
c       Software for the analysis of raw drilling data which is
c       stored in a file named COM. The listing COMSTRUC.LST below
c       the program listing contains information on the required
c       data structure of datafile COM.
c           This software produces and stores to disk parameters for
c       use in the drilling automation programs ODC and EBCM, along
c       with the results of intermediate computations such as flowrate,
c       bit horsepower, and equivalent circulating density.
c           Processed drilling data and generated parameters are store
c       for subsequent use in the DIRECT ACCESS datafile DRLDAT2.
c           Screens which present important transient data in differen
c       manners during data evaluation are available for the user.
```

```
C
C
C
C +++++++++++++ MAIN PROGRAM +++++++++++++++++++++++++++++++++++++++++++++
C
C  * Reception and organization of raw drilling data from file CCM
C
C  * User I/O
C
C  * Organization of subroutines for basic drilling computations,
C    data interpretation, and screen control.
C
C  note: a flag at the beginning of each record indicates the type
C        of data in that record
C
C
C
C
C
      CHARACTER*9 DATE
      CHARACTER*9 TIME
      CHARACTER*8 LIN
      CHARACTER*7 BTYP
      CHARACTER*4 REGION
      CHARACTER*12 RIG
      CHARACTER*8 WELL
      CHARACTER AA
      CHARACTER BB
      DIMENSION GPS(5),PUD(5),PUL(5)
      COMMON /VAR/XN2,XN1,WD2,WD1,ECD2,ECD1,HPB2,HPB1
     *,ROP2,ROP1,D,DO,DI,NBIT,TBOT
      COMMON /REGRES/RDIN,IREG,NREG,RREG(30),DREG(30),WREG(30),GREG(30
C
C  INITIALIZATION
C  Call title screen
      CALL SCRNINIT(0)
      PI=3.1415926
      XN2=0
      WD2=0
      ECD2=0
      HPB2=0
      IREG=1
      NREG=1
      NVAR=1
      CALL QCMOV(0,3)
      WRITE(*,*)
     *'                 Enter O for offset bit run mode'
      CALL QCMOV(0,2)
      WRITE(*,'(A\)')
     *'                 Enter T for data testing mode    --->'
      READ(*,'(A1)')BB
      DFIN=100000.
      IF(BB.EQ.'T')THEN
      CALL TXTCLR(2,2)
      CALL QCMOV(0,3)
      WRITE(*,'(A\)')
     *'                 Enter footage before testing     --->'
      READ(*,'(F7.1)')X
      DFIN=DIN+X
      ENDIF
      CALL TXTCLR(2,2)
      CALL QCMOV(0,3)
      WRITE(*,'(A\)')
     *'                 Enter bit run No. to process     --->'
      READ(*,'(I2)')NBIT
      CALL TXTCLR(2,2)
      CALL QCMOV(0,3)
```

```
      WRITE(*,'(A\)')
     &'                 Enter desired screen  (enter 1, 2, or 3) --->'
      READ(*,'(I2)')ISCRN
C
C  Call the desired screen
      CALL SCRNINIT(ISCRN)
      OPEN(1,FILE='B:COM',STATUS='OLD')
      OPEN(2,FILE='DRLDAT2',STATUS='OLD',ACCESS='DIRECT',RECL=20)
      OPEN(3,FILE='DRLVAR',STATUS='NEW',ACCESS='DIRECT',RECL=20)
C
C  SEARCH FOR BIT RUN NO "NBIT"
    2 CONTINUE
      READ(1,10)N1
C Flag N1=3 indicates record containing bit run number
      IF(N1.EQ.3)THEN
      BACKSPACE 1
      READ(1,40)N1,DI,IBRUN,DIAM,BTYP,I,XJ1,XJ2,XJ3,TW,BW,
     *GW,MTYP
      IF(IBRUN.EQ.NBIT)THEN
      WRITE(2,REC=64)DI
      WRITE(2,REC=44)DIAM
      WRITE(2,REC=65)IBRUN
      WRITE(2,REC=66)XJ1
      WRITE(2,REC=67)XJ2
      WRITE(2,REC=68)XJ3
      WRITE(2,REC=69)TW
      WRITE(2,REC=70)BW
      WRITE(2,REC=71)GW
      WRITE(2,REC=72)MTYP
      NFLAG1=0
      GO TO 3
      ENDIF
C  Read well information stored before third bit run data
      IF(IBRUN.EQ.3)THEN
      NFLAG1=-1
      GO TO 3
      ENDIF
      ENDIF
      GO TO 2
C
C  Read information pertaining to the desired bit run stored
C  above the bit run data
    3 CONTINUE
      BACKSPACE 1
      BACKSPACE 1
      READ(1,10)N1
      IF(N1.EQ.5)THEN
      BACKSPACE 1
      GO TO 5
      ENDIF
      IF(N1.GT.2)GO TO 3
    5 CONTINUE
C
      READ(1,10)N1
   10 FORMAT(I2)
C
      IF(N1.EQ.1)THEN
      XN1=XN2
      XN2=XN
      WD1=WD2
      WD2=WD
      BACKSPACE 1
      READ(1,20)N1,DATE,TIME,D,DBT,WB,XN,PS1,PS2,PS3
   20 FORMAT(I2,A9,A9,2F6.0,2F7.2,3F6.0)
      IF(D.GT.DFIN)GO TO 100
      WRITE(2,REC=58)D
      WRITE(2,REC=57)DBT
```

```
      WRITE(2,REC=60)XN
      WRITE(2,REC=61)WB
      WD=WB/DIAM
      GO TO 5
      ENDIF
C
      IF(N1.EQ.2)THEN
      BACKSPACE 1
      READ(1,30)N1,DELD,WH,TBOT,TOFB,CF,PP,GAS
  30  FORMAT(I2,F8.2,F6.1,2F6.2,2F6.0,F6.1)
      WRITE(2,REC=62)TBOT
      WRITE(2,REC=63)TOFB
      WRITE(2,REC=46)PP
      WRITE(2,REC=47)CF
      ROP1=ROP2
C Calculate pen. rate.
      ROP2=(D-DO)/(TBOT-TOBO)
      DO=D
      TOBO=TBOT
      T=TBOT+TOFB
      IF(ROP1.EQ.0.)GO TO 5
C Data interpretation follows after record starting with N1=2 is read
C Calc. flowrate from pump stroke data
      Q=(GPS(1)*PS1+GPS(2)*PS2+GPS(3)*PS3
     *)/(T-TO)
      WRITE(2,REC=42)Q
      PS1O=PS1
      PS2O=PS2
      PS3O=PS3
      TO=T
      HPB1=HPB2
      ECD1=ECD2
      CLOSE(2)
C Call routine for computation of bit horsepower and eq.circ.den.
      CALL HYDRAUL(DUMMY,HPB,ECD)
      HPB2=HPB
      ECD2=ECD
C Call routine for trans. point analysis. (computation of a1,a2,a3,
C                                          and a6)
      CALL DPRET(ISCRN)
C
C Call routine for regression analysis. (computation of a4, a5
C                                        and a7)
      CALL DPRET2(ISCRN)
C
C STORE VARIABLE VALUES IN DRLVAR
      CLOSE(3)
      CALL VARSTO(NVAR,ROP2,D,HPB2,ECD2,WREG(NVAR),GREG(NVAR),XN,WB)
C OPTIONAL CALL TO COMPUTE PRE STATISTIC
      CALL PRESTA(PRE)
      OPEN(3,FILE='DRLVAR',STATUS='OLD',ACCESS='DIRECT',RECL=20)
      OPEN(2,FILE='DRLDAT2',STATUS='OLD',ACCESS='DIRECT',RECL=20)
      GO TO 5
      ENDIF
C
      IF(N1.EQ.3)THEN
      IF(NFLAG1.EQ.0)THEN
      NFLAG1=1
      GO TO 5
      ENDIF
      IF(NFLAG1.EQ.-1)THEN
      NFLAG1=0
      GO TO 2
      ENDIF
      CALL TXTCLR(2,2)
      CALL QCMOV(5,1)
      WRITE(*,*) ' Start of new bit run encountered.'
```

```
  32 CONTINUE
     WRITE(*,'(A\)')
    & ' Do you wish to process this bit run? (Y/N) --->'
     READ(*,'(A1)')AA
     IF(AA.EQ.'N')GO TO 100
     IF(AA.EQ.'Y')GO TO 3
  40 FORMAT(I2,F6.0,I4,F6.2,A7,I3,3F3.0,3F4.0,I2)
  41 FORMAT(1X,F6.0,I4,F6.2,A7,I3,3F3.0,3F4.0,I2)
     GO TO 32
     ENDIF
C
     IF(N1.EQ.4)THEN
     BACKSPACE 1
     READ(1,50)N1,PEFF,PUD(1),PUL(1),PUD(2),PUL(2)
    *,PUD(3),PUL(3),PTYP
  50 FORMAT(I2,F7.0,F3.0,F10.3,F3.0,F7.0,F6.0,F7.0,F6.0)
     PEFF=1.-PEFF
     WRITE(2,REC=73)PEFF
     WRITE(2,REC=74)PUD(1)
     WRITE(2,REC=75)PUL(1)
     WRITE(2,REC=76)PUD(2)
     WRITE(2,REC=77)PUL(2)
     WRITE(2,REC=78)PUD(3)
     WRITE(2,REC=79)PUL(3)
     WRITE(2,REC=80)PTYP
     GPS(1)=PUD(1)**2*PI*PUL(1)/924.06857
     GPS(2)=PUD(2)**2*PI*PUL(2)/924.06857
     GPS(3)=PUD(3)**2*PI*PUL(3)/924.06857
     GO TO 5
     ENDIF
C
     IF(N1.EQ.5)THEN
     BACKSPACE 1
     READ(1,60)N1,REGION,RIG,WELL
  60 FORMAT(I2,A4,A12,A3)
     WRITE(2,REC=81)REGION
     WRITE(2,REC=82)RIG
     WRITE(2,REC=83)WELL
     GO TO 5
     ENDIF
C
     IF(N1.EQ.6)THEN
     BACKSPACE 1
     READ(1,70)N1,DEPMM,RHOF,PV,IFVIS,IYP,APIWB,PH,IGIN,IGFIN
    *,ICHLO,ICA,WLAPTP,VAP,PM,PF,XMF
  70 FORMAT(I2,F6.0,F5.2,F5.1,2I3,F5.1,F4.1,2I3,I6,I5,2F5.1,
    *3F4.0)
     WRITE(2,REC=84)DEPMM
     WRITE(2,REC=54)RHOF
     WRITE(2,REC=49)PV
     WRITE(2,REC=85)IFVIS
     WRITE(2,REC=50)IYP
     WRITE(2,REC=86)APIWB
     WRITE(2,REC=87)PH
     WRITE(2,REC=88)IGIN
     WRITE(2,REC=89)IGFIN
     WRITE(2,REC=90)ICHLO
     WRITE(2,REC=91)ICA
     WRITE(2,REC=92)WLAPTP
     WRITE(2,REC=93)VAP
     WRITE(2,REC=94)PM
     WRITE(2,REC=95)PF
     WRITE(2,REC=96)XMF
     GO TO 5
     ENDIF
```

```
C
      IF(N1.EQ.9)THEN
      BACKSPACE 1
      READ(1,80)N1,SAND,SOLID,OIL,MTYP
   80 FORMAT(I2,2F4.1,F3.0,I1)
      WRITE(2,REC=97)SAND
      WRITE(2,REC=98)SOLID
      WRITE(2,REC=99)OIL
      WRITE(2,REC=72)MTYP
      GO TO 5
      ENDIF
C
      IF(N1.EQ.10)THEN
      GO TO 5
      ENDIF
C
      IF(N1.EQ.11)THEN
      GO TO 5
      ENDIF
C
      IF(N1.EQ.20)THEN
      GO TO 5
      ENDIF
C
      GO TO 5
  100 CONTINUE
      CALL TXTCLR(2,2)
      CALL QCMOV(5,1)
      WRITE(*,*) ' DRECEP terminated;'
      CLOSE (1)
      CLOSE (2)
      STOP
      END
C
C
C ++++++++++++ SUBROUTINE HYDRAUL ++++++++++++++++++++++++++++++++++
C
      SUBROUTINE HYDRAUL(DOMMY,HPB,ECD)
C   THIS SUBROUTINE COMPUTES EQUIVALENT CIRCULATING DENSITY AND
C   BIT HORSEPOWER FROM MUD PROPERTIES AND WELL DIMENSIONS
      REAL IR
      DIMENSION D1(10),D2(10),DI(10),SL(10)
      OPEN(2,FILE='DRLDAT2',STATUS='OLD',ACCESS='DIRECT',RECL=20)
      READ(2,REC=1)XX
      NS=INT(XX)
      DO 10 I=1,NS
      I1=2+(I-1)*4
      READ(2,REC=I1)DI(I)
      I2=I1+1
      READ(2,REC=I2)D1(I)
      I2=I2+1
      READ(2,REC=I2)D2(I)
      I2=I2+1
      READ(2,REC=I2)SL(I)
   10 CONTINUE
      READ(2,REC=42)Q
      READ(2,REC=43)DS
      READ(2,REC=44)DB
      READ(2,REC=45)ROPE
      READ(2,REC=46)PP
      READ(2,REC=47)CP
      READ(2,REC=48)IR
      IF(IR.EQ.1.00)THEN
      READ(2,REC=49)PV
      READ(2,REC=50)YP
      T3=YP+PV
```

```
      T6=PV+T3
      RN=3.32*ALOG10(T6/T3)
      RK=510.*T3/511.**RN
      ELSE
      READ(2,REC=51)RK
      READ(2,REC=52)RN
      ENDIF
      READ(2,REC=53)RHOS
      READ(2,REC=54)RHOF
      BHP=CP
      TOTL=0.
      DPDP=0.
      XX=0.
      DO 20 I=1,NS
      VA=Q/2.448/(D2(I)**2-D1(I)**2)
      VAP=Q/2.448/DI(I)**2
      CALL SLIPV(RK,RN,D1(I),D2(I),DS,RHOS,RHOF,VA,VS)
      RT=1.-VS/VA
      RHOA=RHOF*(1.-SF)+RHOF*SF
      IF(IR.EQ.1.00)THEN
      CALL GRADF(RHOA,PV,YP,IR,D1(I),D2(I),VA,GF)
      CALL GRADF(RHOF,PV,YP,IR,XX,DI(I),VAP,GFI)
      ELSE
      CALL GRADF(RHOA,RK,RN,IR,D1(I),D2(I),VA,GF)
      CALL GRADF(RHOF,RK,RN,IR,XX,DI(I),VAP,GFI)
      ENDIF
      BHP=BHP+(.052*RHOA+GF)*SL(I)
      DPDP=DPDP+(.052*RHOF-GFI)*SL(I)
      TOTL=TOTL+SL(I)
   20 CONTINUE
      ECD=BHP/(.052*TOTL)
      DFB=PP+DPDP-BHP
      IF(DFB.GE.0.)THEN
      HFB=DFB*Q/1714.
      WRITE(2,REC=55)ECD
      WRITE(2,REC=56)HFB
      ENDIF
      CLOSE(2)
      RETURN
      END
C
C
C
C
C +++++++++++-++ SUBROUTINE SLIPV ++++++++++++++++++++++++++++++++++-++++
C
      SUBROUTINE SLIPV(RK,RN,D1,D2,DS,RHOS,RHOF,VA,VS)
C  SUBROUTINE FOR CALCULATION OF SLIP VELOCITY OF CUTTINGS
C  PRESTON-MOORE CORRELATION ASSUMED
C
      AVIS=(RK/144.)*((D2-D1)/VA)**(1.-RN)*((2.+1./RN)
     &/0.0208)**RN
      VSL=82.87*DS**2*(RHOS-RHOF)/AVIS
      VS=VSL
      VSI=2.9*DS*(RHOS-RHOF)**.667/RHOF**.333/AVIS**.333
      IF(VSI.LT.VS)VS=VSI
      VST=1.54*(DS*(RHOS-RHOF)/RHOF)**.5
      IF(VST.LT.VS)VS=VST
      RETURN
      END
C
C
C
C ++++++++++++ SUBROUTINE GRADF ++++++++++++++++++++++++++-++++++++++++
C
      SUBROUTINE GRADF(W,X1,X2,IR,D1,D2,VE,GF)
C  SUBROUTINE FOR CALCULATION OF FRICTIONBAL P DROP IN
C  SECTION OF PIPE OR ANNULUS
      REAL IR
```

```
      IF(D1.GT.0.)THEN
      DE=.816*(D2-D1)
      ELSE
      DE=D2
      ENDIF
      IF(IR.EQ.2)THEN
      IF(D1.GT.0.)THEN
      UE=X1/144.*((D2-D1)/VE)**(1.-X2)*((2.+1./X2)/.0208)**X2
      ELSE
      UE=X1/96.*(D2/VE)**(1.-X2)*((3.+1./X2)/.0416)**X2
      ENDIF
      ELSE
      UE=X1
      X1=1.
      ENDIF
      R=928.*W*VE*DE/UE
      CALL FFPOW(X1,R,F,I)
      GF=F*W*VE*2./25.8/DE
      IF(D1.GT.0.)THEN
      GF2=UE*VE/1000./(D2-D1)**2
      IF(IR.EQ.1.00)GF2=GF2+X2/200./(D2-D1)
      ELSE
      GF2=UE*VE/1500./D2**2
      IF(IR.EQ.1.00)GF2=GF2+X2/225./D2
      ENDIF
      IF(GF2.GT.GF)GF=GF2
      RETURN
      END
C
C
C
C ++++++++++++- SUBROUTINE FFPOW +++++++++++++++++++++++++++++++++++++
C
C
      SUBROUTINE FFPOW(XN,RN,F,I)
C  SUBROUTINE FOR CALCULATION OF FRICTION FACTORS
      IF(RN.LT.1000.) GO TO 30
      FO=.01
      I=0
   10 X=4./XN**.75*ALOG10(RN*FO**(1.-XN/2.))-.395/XN**1.2
      F=1/X/X
      I=I+1
      IF(I.GT.200)GO TO 20
      IF((ABS(F-FO)/FO).LT.1.0E-4)RETURN
      FO=F
      GO TO 10
   20 WRITE(*,*) 'Error*** FFPOW did not converge'
   30 F=16./RN
      RETURN
      END
C
C
C
C
C +++++++++++++ SUBROUTINE DPRET ++++++++++++++++++++++++++++++++++++++
C
C
      SUBROUTINE DPRET(ISCRN)
C  Subroutine for Interpretation of Data Gathered while
C  Drilling
C  Interpretation by Transition Point Analysis
C  Output - Parameters a1,a2,a3, and a6 for use in EBCM
C           and ODC models
C
      COMMON /VAR/XN2,XN1,WD2,WD1,ECD2,ECD1,HFB2,HFB1
     *,ROP2,ROP1,D,DO,DI,NBIT,TBOT
      COMMON /PAR/A1,A7,A5,A6,A1,A2,A4,AP,PCHAN(8)
      COMMON /FLAG/IFLAG4(5),IFLAG5(4),N
      DIMENSION IFLAG1(4),IFLAG2(4),IFLAG3(4)
```

```
      OPEN(2,FILE='DRLDAT2',STATUS='OLD',ACCESS='DIRECT',RECL=20)
      DAVG=D+100.
      READ(2,REC=109)A6
      READ(2,REC=110)A1
      READ(2,REC=111)A2
      READ(2,REC=113)A3
      READ(2,REC=106)WBT
      READ(2,REC=44)DB
      WDT=WBT/DB
      DO 10 I=1,4
      IFLAG1(I)=0
   10 CONTINUE
      IF(ECD1.EQ.0.00)THEN
      ECD1=ECD2
      HPB1=HPB2
      WD1=WD2
      XN1=XN2
      RETURN
      ENDIF
C
C % change in variables over trans. point
      PCHAN(1)=200.*ABS((XN1-XN2)/(XN1+XN2))
      PCHAN(2)=200.*ABS((WD1-WD2)/(WD1+WD2))
      PCHAN(3)=200.*ABS((ECD1-ECD2)/(ECD1+ECD2))
      PCHAN(4)=200.*ABS((HPB1-HPB2)/(HPB1+HPB2))
      PCHAN(7)=200.*ABS((DO-D)/(DO+D))
      PCHAN(9)=200.*ABS((ROP1-ROP2)/(ROP1+ROP2))
C
      IF(PCHAN(1).GT.10.) IFLAG1(1)=1
      IF(PCHAN(2).GT.10.) IFLAG1(2)=1
      IF(PCHAN(3).GT.10.) IFLAG1(3)=1
      IF(PCHAN(4).GT.10.) IFLAG1(4)=1
C
      DO 20 I=1,4
      I1=499+I
      I2=503+I
      I3=507+I
      READ(2,REC=I1)XX
      IFLAG2(I)=INT(XX)
      READ(2,REC=I2)XX
      IFLAG4(I)=INT(XX)
      READ(2,REC=I3)XX
      IFLAG5(I)=INT(XX)
   20 CONTINUE
C
      DO 30 I=1,4
      IF(IFLAG1(I).EQ.1)THEN
      IF(IFLAG2(I).EQ.1)IFLAG3(I)=1
      ENDIF
   30 CONTINUE
C
      N=0
      IFLAG4(0)=100000
      MINF4=100000
C
      DO 90 I=1,4
      IF(IFLAG1(I).EQ.1)THEN
      DO 80 J=1,4
      IF(J.EQ.I)GO TO 70
      IF(IFLAG1(J).EQ.1.AND.IFLAG3(J).NE.1)GO TO 85
C alternative    IF((PCHAN(J)-PCHAN(N))*2./(PCHAN(J)+PCHAN(N))
C criterion      $.GT..5.AND.IFLAG3(I).EQ.1)N=J
```

```
C
C Comp. parameter that has been calc'd the least
      IF(IFLAG4(I).LT.MINF4)THEN
      N=I
      MINF4=IFLAG4(I)
      ENDIF
   70 CONTINUE
   80 CONTINUE
      ENDIF
   85 CONTINUE
   90 CONTINUE
C
      DO 95 I=1,4
      IFLAG5(I)=IFLAG5(I)+IFLAG1(I)
      XX=REAL(IFLAG5(I))
      I1=507+I
      WRITE(2,REC=I1)XX
   95 CONTINUE
C
      IF(N.EQ.0)GO TO 200
C
      IF(N.EQ.1)THEN
      A2=LOG(ROP1/ROP2)/LOG(XN1/XN2)
C Normalization
      IF(IFLAG2(2).EQ.1)A2=A2+LOG((((WD2-WDT)/(4.-WDT))/
     *((WD1-WDT)/(4.-WDT)))**A1)/LOG(XN1/XN2)
      IF(IFLAG2(3).EQ.1)A2=A2+2.303*A6*DAVG*(ECD2-ECD1)/LOG
     *(XN1/XN2)
      IF(IFLAG2(4).EQ.1)A2=A2+LOG((HPB2/HPB1)**A3)/LOG(XN1/XN2)
      IFLAG2(1)=1
      READ(2,REC=111)AP
      A2=(IFLAG4(1)*AP+A2)/(IFLAG4(1)+1)
      IFLAG4(1)=IFLAG4(1)+1
      WRITE(2,REC=111)A2
      XX=REAL(IFLAG2(1))
      WRITE(2,REC=500)XX
      XX=REAL(IFLAG4(1))
      WRITE(2,REC=504)XX
      ENDIF
C
      IF(N.EQ.2)THEN
      A1=LOG(ROP1/ROP2)/LOG(((WD1-WDT)/(4.-WDT))/
     *((WD2-WDT)/(4.-WDT)))
C Normalization
      IF(IFLAG2(1).EQ.1)A1=A1+LOG((XN2/XN1)**A2)/LOG(((WD1-WDT)
     */(4.-WDT))/((WD2-WDT)/(4.-WDT)))
      IF(IFLAG2(3).EQ.1)A1=A1+2.303*A6*DAVG*(ECD2-ECD1)
     */LOG(((WD1-WDT)/(4.-WDT))/((WD2-WDT)/(4.-WDT)))
      IF(IFLAG2(4).EQ.1)A1=A1+LOG((HPB2/HPB1)**A3)
     */LOG(((WD1-WDT)/(4.-WDT))/((WD2-WDT)/(4.-WDT)))
      IFLAG2(2)=1
      READ(2,REC=110)AP
      A1=(IFLAG4(2)*AP+A1)/(IFLAG4(2)+1)
      IFLAG4(2)=IFLAG4(2)+1
      WRITE(2,REC=110)A1
      XX=REAL(IFLAG2(2))
      WRITE(2,REC=501)XX
      XX=REAL(IFLAG4(2))
      WRITE(2,REC=505)XX
      ENDIF
C
      IF(N.EQ.3)THEN
      A6=LOG(ROP1/ROP2)/(2.303*DAVG*(ECD1-ECD2))
C Normalization
      IF(IFLAG2(1).EQ.1)A6=A6+LOG((XN2/XN1)**A2)/
     *(2.303*DAVG*(ECD1-ECD2))
```

```
      IF(IFLAG2(2).EQ.1)A6=A6+LOG((((WD2-WDT)/(4.-WDT))/
     *((WD1-WDT)/(4.-WDT)))**A1)/(2.303*DAVG*(ECD1-ECD2))
      IF(IFLAG2(4).EQ.1)A6=A6+LOG((HPB2/HPB1)**A3)/
     *(2.303*DAVG*(ECD1-ECD2))
      IFLAG2(3)=1
      READ(2,REC=109)AP
      A6=(IFLAG4(3)*AP+A6)/(IFLAG4(3)+1)
      IFLAG4(3)=IFLAG4(3)+1
      WRITE(2,REC=109)A6
      XX=REAL(IFLAG2(3))
      WRITE(2,REC=502)XX
      XX=REAL(IFLAG4(3))
      WRITE(2,REC=506)XX
      ENDIF
C
      IF(N.EQ.4)THEN
      A3=LOG(ROP1/ROP2)/LOG(HPB1/HPB2)
C Normalization
      IF(IFLAG2(1).EQ.1)A3=A3+LOG((XN2/XN1)**A2)/
     *LOG(HPB1/HPB2)
      IF(IFLAG2(2).EQ.1)A3=A3+LOG((((WD2-WDT)/(4.-WDT))/
     *((WD1-WDT)/(4.-WDT)))**A1)/LOG(HPB1/HPB2)
      IF(IFLAG2(3).EQ.1)A3=A3+2.303*A6*DAVG*(ECD2-ECD1)
     */LOG(HPB1/HPB2)
      IFLAG2(4)=1
      READ(2,REC=113)AP
      A3=(IFLAG4(4)*AP+A3)/(IFLAG4(4)+1)
      IFLAG4(4)=IFLAG4(4)+1
      WRITE(2,REC=113)A3
      XX=REAL(IFLAG2(4))
      WRITE(2,REC=503)XX
      XX=REAL(IFLAG4(4))
      WRITE(2,REC=507)XX
      ENDIF
C
  200 CONTINUE
C  Write results to the screen
      IF(ISCRN.EQ.1)THEN
      CALL SCRNCTRL(ISCRN)
      ENDIF
      CLOSE(2)
      RETURN
      END
C
C
C ++++++++++++ SUBROUTINE DFRET2 +++++++++++++++++++++++++++++++
C
      SUBROUTINE DFRET2(ISCRN)
C  Subroutine for Interpretation of Data Gathered while
C  Drilling
C  Interpretation by Regression Analysis
C  Output - Parameters a4,a5, and a7 for use in EBCM
C           and ODC models
C
      COMMON /REGRES/RDIN,IREG,NREG,RREG(30),DREG(30),WREG(30),GREG(30)
      COMMON /VAR/XN2,XN1,WD2,WD1,ECD2,ECD1,HPB2,HPB1
     *,ROP2,ROP1,D,DO,DI,NBIT,TBOT
      COMMON /PAR/A1,A7,A5,A6,A1,A2,A4,AP,PCHAN(8)
      OPEN(2,FILE='DRLDAT2',STATUS='OLD',ACCESS='DIRECT',RECL=20)
      IF((D-RDIN).LT.50.)THEN
      RREG(IREG)=(RREG(IREG)*NREG+ROP2)/(NREG+1)
      DREG(IREG)=(DREG(IREG)*NREG+D)/(NREG+1)
      WREG(IREG)=(WREG(IREG)*NREG+W)/(NREG+1)
      GREG(IREG)=(GREG(IREG)*NREG+GP)/(NREG+1)
      NREG=NREG+1
      ELSE
      RDIN=D
      NREG=1
```

```fortran
      IF(IREG.GE.4)THEN
      CALL REGRE(IREG,RREG,DREG,WREG,GREG,A4,A5,A7)
      IREG=IREG+1
      ENDIF
      ENDIF
      RETURN
      END
C
C ++++++++++++ SUBROUTINE REGRE ++++++++++++++++++++++++++++++++
C
      SUBROUTINE REGRE(IREG,RREG,DREG,WREG,GREG,A4,A5,A7)
      DIMENSION RREG(30),DREG(30),WREG(30),GREG(30),AA(4,5)
C
      SW=0.
      SX=0.
      SY=0.
      SZ=0.
      SW2=0.
      SX2=0.
      SY2=0.
      SWX=0.
      SWY=0.
      SXY=0.
      SZW=0.
      SZX=0.
      SZY=0.
C
      DO 10 I=1,IREG
      SW=SW-WREG(I)
      SX=SX+GREG(I)
      SY=SY+(10000-DREG(I))
      SZ=SZ+RREG(I)
      SW2=SW2+WREG(I)**2.
      SX2=SX2+GREG(I)**2.
      SY2=SY2+(10000-DREG(I))**2
      SWX=SWX-WREG(I)*GREG(I)
      SWY=SWY-WREG(I)*(10000.-DREG(I))
      SXY=SXY+GREG(I)*(10000.-DREG(I))
      SZW=SZW-RREG(I)*WREG(I)
      SZX=SZX+RREG(I)*GREG(I)
      SZY=SZY+RREG(I)*(10000.-DREG(I))
   10 CONTINUE
C
      AA(1,1)=IREG
      AA(2,1)=SW
      AA(3,1)=SX
      AA(4,1)=SY
      AA(1,2)=SW
      AA(2,2)=SW2
      AA(3,2)=SWX
      AA(4,2)=SWY
      AA(1,3)=SX
      AA(2,3)=SWX
      AA(3,3)=SX2
      AA(4,3)=SXY
      AA(1,4)=SY
      AA(2,4)=SWY
      AA(3,4)=SXY
      AA(4,4)=SY2
      AA(1,5)=SZ
      AA(2,5)=SZW
      AA(3,5)=SZX
      AA(4,5)=SZY
C
C     GAUSS-JORDAN ELIMINATION
      CALL GAUJOR(AA,A,B,C,D)
      A4=B
      A5=C
```

```
      A7=D
      RETURN
      END
C
C ++++++++++++ SUBROUTINE GAUJOR ++++++++++++++++++++++++++++++
C
C  SUBROUTINE FOR GAUSS-JORDAN ELIMINATION WITH PARTIAL PIVOTING
C
      SUBROUTINE GAUJOR(AA,A1,A2,A3,A4)
      DIMENSION AA(4,5),RTIO
      N=4
      CF=0.
      N1=N
      N2=N+1
      DO 100 K=1,N1
C        PIVOTING
         NR=N
         IX=1
    NC=N2-1
    IF(K.NE.NC)THEN
    DO 30 IS=K,NR
    JS=K
    BG=ABS(AA(IS,K))
    DO 20 JJ=JD,NC
    AX=ABS(AA(IS,JJ))
    IF(AX.GT.BG)BS=AX
20  CONTINUE
    IF(BG.LT.0.00001) THEN
    WRITE(*,*)"      *** Gauss-Jordan elim. ERROR ***"
    WRITE(*,*)"*** Row with ZERO elements encountered ***"
    ENDIF
    RTIO(IS)=AA(IS,K)/BG
30  CONTINUE
    IS=K
    IR=IS
    PV=ABS(RTIO(IS))
    JD=IS+1
    DO 40 JS=JD,NR
    BT=ABS(RTIO(JS))
    IF(BT.GT.PV)THEN
    IR=JS
    PV=BT
    ENDIF
40  CONTINUE
    IF(IR.NE.K)THEN
    IK=IR
    DO 50 JM=K,N2
    DM=AA(K,JM)
    AA(K,JM)=AA(IK,JM)
    AA(IK,JM)=DM
50  CONTINUE
    ENDIF
    ENDIF
    S=AA(K,K)
    DO 60 J=K,N2
    AA(K,J)=AA(K,J)/S
60  CONTINUE
    DO 80 I=1,N1
    IF(I.NE.K)THEN
    J=K
    S=AA(I,K)
70  CONTINUE
    AA(I,J)=AA(I,J)-S*AA(K,J)
    J=J+1
    IF(J.LE.N2)GO TO 70
    ENDIF
80  CONTINUE
100 CONTINUE
```

```
      A1=A(1,N2)
      A2=A(2,N2)
      A3=A(3,N2)
      A4=A(4,N2)
      RETURN
      END
C
      SUBROUTINE VARSTO(NVAR,ROP2,D,HPB2,ECD2,WREG(NVAR),
     *GREG(NVAR),XN,WB)
      OPEN(3,FILE='DRLVAR',STATUS='OLD',ACCESS='DIRECT',RECL=20)
      NV=(NVAR-1)*8+1
      WRITE(2,REC=NV)ROP2
      WRITE(2,REC=NV+1)D
      WRITE(2,REC=NV+2)HPB2
      WRITE(2,REC=NV+3)ECD2
      WRITE(2,REC=NV+4)WREG(NVAR)
      WRITE(2,REC=NV+5)GREG(NVAR)
      WRITE(2,REC=NV+6)XN
      WRITE(2,REC=NV+7)WB
      NVAR=NVAR+1
      CLOSE(3)
      RETURN
      END
C
      SUBROUTINE PRESTA(NVAR,PRE)
      DIMENSION ROP(200),WD(200),XN(200),HPB(200),W(200),GP(200)
     $,ECD(200),D(200)
      COMMON /PAR/A1,A7,A5,A6,A1,A2,A4,AP,PCHAN(8)
      IF(NVAR.LT.30)RETURN
      OPEN(3,FILE='DRLVAR',STATUS='OLD',ACCESS='DIRECT',RECL=20)
      M=20
      N=NVAR
      DO 10 I=1,N
      NV=(I-1)*8+1
      READ(2,REC=NV)ROP(I)
      READ(2,REC=NV+1)D(I)
      READ(2,REC=NV+2)HPB(I)
      READ(2,REC=NV+3)ECD(I)
      READ(2,REC=NV+4)W(I)
      READ(2,REC=NV+5)GP(I)
      READ(2,REC=NV+6)XN(I)
      READ(2,REC=NV+7)WB(I)
      XK=XK+ROP(I)/(((WD(I)-WDT)/(4.-WDT))**A1*XN(I)**A2*HPB(I)**A3
     $*EXP(-A4*W(I)+A5*GP(I)+A6*(GP(I)-ECD(I))+A7*(10000-D(I))))
   10 CONTINUE
      XK=XK/N
      DO 20 I=M,N
      RSIM=XK*((WD(I)-WDT)/(4.-WDT))**A1*XN(I)**A2*HPB(I)**A3
     $*EXP(-A4*W(I)+A5*GP(I)+A6*(GP(I)-ECD(I))+A7*(10000-D(I)))
      SUM=SUM+(ROP(I)-RSIM)**2.
   20 CONTINUE
      PRE=SQR(SUM)/(N-M+1)
      CLOSE(3)
      RETURN
      END
C
C ++++++++++++ SUBROUTINE SCRNINIT  ++++++++++++++++++++++++++++
C
      SUBROUTINE SCRNINIT(ISCRN)
C SUBROUTINE CALLING SCREEN NO. ISCRN
      DIMENSION IX(4),IY(4),A(80)
      CHARACTER A
      CHARACTER*6 FNAME
      CALL QSCLR
      CALL QPCLR
C
```

```
      IF(ISCRN.EQ.0)THEN
      FNAME='SCRNF0'
      ENDIF
      IF(ISCRN.EQ.1)THEN
      FNAME='SCRNF1'
      ENDIF
      IF(ISCRN.EQ.2)THEN
      FNAME='SCRNF2'
      ENDIF
      IF(ISCRN.EQ.3)THEN
      FNAME='SCRNF3'
      ENDIF
C
      OPEN(1,FILE=FNAME,STATUS='OLD')
C
      READ(1,40)NPNT
      IF(NPNT.GT.0)THEN
      DO 10 J=1,NPNT
      READ(1,30)(IX(I),I=1,4)
      READ(1,30)(IY(I),I=1,4)
      READ(1,40)KOLOR
      CALL PAINT(IX,IY,KOLOR)
   10 CONTINUE
      ENDIF
C
      READ(1,40)NLIN
      IF(NLIN.GT.0)THEN
      DO 15 J=1,NLIN
      READ(1,60)IX1,IY1,IX2,IY2,KOLOR
      CALL QLINE(IX1,IY1,IX2,IY2,KOLOR)
   15 CONTINUE
      ENDIF
C
      READ(1,40)NTXT
      IF(NTXT.GT.0)THEN
      CALL QCMOV(0,24)
      A(1)=' '
      DO 5 J=1,25
      READ(1,20)(A(I),I=2,77),KOLOR
      CALL QTYPE(32,KOLOR)
      WRITE(*,21)(A(I),I=1,77)
    5 CONTINUE
      ENDIF
C
      CLOSE(1)
      CALL QTYPE(32,6)
      CALL QCMOV(0,24)
      WRITE(*,*)'Bit Run No.     - '
      WRITE(*,*)'Initial Depth   - '
      WRITE(*,*)'Current Depth   - '
      WRITE(*,*)'Time on Bottom  - '
   20 FORMAT(76A1,I2)
   21 FORMAT(77A1)
   30 FORMAT(4I3)
   40 FORMAT(I2)
   50 FORMAT(3I2)
   60 FORMAT(4I3,I2)
      RETURN
      END
C
C ++++++++++++ SUBROUTINE SCRNCTRL  +++++++++++++++++++++++++++
C
      SUBROUTINE SCRNCTRL(ISCRN)
C  SUBROUTINE FOR CONTROL OF DIFFERENT SCREENS
      COMMON /VAR/XN2,XN1,WD2,WD1,ECD2,ECD1,HPB2,HPB1
     *,ROP2,ROP1,D,DO,DI,NBIT,TBOT
      COMMON /PAR/A7,A5,A6,A1,A2,A4,A3,AP,PCHAN(8)
      COMMON /FLAG/IFLAG4(4),IFLAG5(4),N
```

```
C
      CHARACTER*4 BBB
      BBB='N.C.'
      IF(ISCRN.EQ.1)THEN
      CALL QTYPE(32,7)
      CALL QCMOV(0,24)
      WRITE(*,50)NBIT
      CALL QTYPE(32,6)
      CALL QCMOV(0,24)
      WRITE(*,*)'Bit Run No.    - '
      CALL QTYPE(32,7)
      CALL QCMOV(0,23)
      WRITE(*,51)DI
      CALL QTYPE(32,6)
      CALL QCMOV(0,23)
      WRITE(*,*)'Initial Depth  - '
      CALL QTYPE(32,7)
      CALL QCMOV(0,22)
      WRITE(*,51)D
      CALL QTYPE(32,6)
      CALL QCMOV(0,22)
      WRITE(*,*)'Current Depth  - '
      CALL QTYPE(32,7)
      CALL QCMOV(0,21)
      WRITE(*,52)TBOT
      CALL QTYPE(32,6)
      CALL QCMOV(0,21)
      WRITE(*,*)'Time on Bottom - '
C
      CALL QTYPE(32,7)
      CALL QCMOV(0,13)
      WRITE(*,40)BBB,BBB,BBB,BBB
      CALL QTYPE(32,4)
      WRITE(*,60)'a2'
      CALL QTYPE(32,7)
      CALL QCMOV(0,13)
      WRITE(*,41)DO,D,PCHAN(7)
      CALL QTYPE(32,4)
      CALL QCMOV(0,13)
      WRITE(*,61)' D'
C
      CALL QTYPE(32,7)
      CALL QCMOV(0,12)
      WRITE(*,40)BBB,BBB,BBB,BBB
      CALL QTYPE(32,4)
      CALL QCMOV(0,12)
      WRITE(*,60)'a3'
      CALL QTYPE(32,7)
      CALL QCMOV(0,12)
      WRITE(*,42)GFO,GF,BBB
      CALL QTYPE(32,4)
      CALL QCMOV(0,12)
      WRITE(*,61)'Gp'
C
      KOLOR=7
      A6P=A6
      IF(N.EQ.3)THEN
      KOLOR=2
      A6P=AP
      ENDIF
      CALL QTYPE(32,KOLOR)
      CALL QCMOV(0,11)
      CALL QTYPE(32,4)
      CALL QCMOV(0,11)
      WRITE(*,60)'a4'
      CALL QTYPE(32,KOLOR)
      CALL QCMOV(0,11)
      WRITE(*,41)ECD1,ECD2,PCHAN(3)
```

```
      CALL QTYPE(32,4)
      CALL QCMOV(0,11)
      WRITE(*,61)'ECD'
C
      KOLOR=7
      A1P=A1
      IF(N.EQ.2)THEN
      KOLOR=2
      A1P=AP
      ENDIF
      CALL QTYPE(32,KOLOR)
      CALL QCMOV(0,10)
      WRITE(*,43)A1P,A1,IFLAG4(2),IFLAG5(2)
      CALL QTYPE(32,4)
      CALL QCMOV(0,10)
      WRITE(*,60)'a5'
      CALL QTYPE(32,KOLOR)
      CALL QCMOV(0,10)
      WRITE(*,41)WD1,WD2,PCHAN(2)
      CALL QTYPE(32,4)
      CALL QCMOV(0,10)
      WRITE(*,61)'WD'
C
      KOLOR=7
      A2P=A2
      IF(N.EQ.1)THEN
      KOLOR=2
      A2P=AP
      ENDIF
      CALL QTYPE(32,KOLOR)
      CALL QCMOV(0,9)
      WRITE(*,43)A2P,A2,IFLAG4(1),IFLAG5(1)
      CALL QTYPE(32,4)
      CALL QCMOV(0,9)
      WRITE(*,60)'a6'
      CALL QTYPE(32,KOLOR)
      CALL QCMOV(0,9)
      WRITE(*,41)XN1,XN2,PCHAN(1)
      CALL QTYPE(32,4)
      CALL QCMOV(0,9)
      WRITE(*,61)' N'
C
      CALL QTYPE(32,7)
      CALL QCMOV(0,8)
      WRITE(*,40)BBB,BBB,BBB,BBB
      CALL QTYPE(32,4)
      CALL QCMOV(0,8)
      WRITE(*,60)'a7'
      CALL QTYPE(32,7)
      CALL QCMOV(0,8)
      WRITE(*,42)WO,W,BBB
      CALL QTYPE(32,4)
      CALL QCMOV(0,8)
      WRITE(*,61)' w'
C
      KOLOR=7
      A3P=A3
      IF(N.EQ.4)THEN
      KOLOR=2
      A3P=AP
      ENDIF
      CALL QTYPE(32,KOLOR)
      CALL QCMOV(0,7)
      WRITE(*,43)A3P,A3,IFLAG4(4),IFLAG5(4)
      CALL QTYPE(32,4)
      CALL QCMOV(0,7)
```

```
      WRITE(*,60) 'a8'
      CALL QTYPE(32,KOLOR)
      CALL QCMOV(O,7)
      WRITE(*,41)HPB1,HPB2,PCHAN(4)
      CALL QTYPE(32,4)
      CALL QCMOV(0,7)
      WRITE(*,61) 'HPB'
C
      CALL QTYPE(32,7)
      CALL QCMOV(0,6)
      WRITE(*,41)ROP1,ROP2,PCHAN(8)
      CALL QCMOV(0,6)
      WRITE(*,61) 'ROP'
C
   41 FORMAT(7X,F7.1,3X,F7.1,4X,F5.1)
   42 FORMAT(7X,F7.1,3X,F7.1,5X,A4)
   43 FORMAT(44X,E9.3,1X,E9.3,4X,I4,3X,I4)
   40 FORMAT(47X,A4,6X,A4,6X,A4,3X,A4)
   50 FORMAT(19X,I4)
   51 FORMAT(19X,F7.1,' ft')
   52 FORMAT(19X,F7.2,' hrs')
   60 FORMAT(39X,A2)
   61 FORMAT(1X,A3)
C
      ENDIF
      RETURN
      END
C
C ++++++++++ UTILITY SUBROUTINES ++++++++++++++++++++++++++++++++++++++
C
      SUBROUTINE PAINT(IX,IY,KOLOR)
      DIMENSION IX(4),IY(4)
      DO 10 I=IY(1),IY(4)
      CALL QLINE(IX(1),I,IX(2),I,4)
   10 CONTINUE
      RETURN
      END
C
      SUBROUTINE TXTCLR(NROWS,ISTART)
      IFIN=ISTART+NROWS-1
      DO 10 I=ISTART,IFIN
      WRITE(*,*)
     *' '
   10 CONTINUE
      RETURN
      END
```

************************************************************************

COMSTRUC.LST

Configuration and Format of Datafile COM

Datafile COM presents 6 types of information which are stored
in one or two disk tracks of memory. At the beginning of every
disk track there is a specified flag which permits the recog-
nition of the information stored in that track. Below is a list
of flags and the information they are associated with, which is
followed by a list containing nomenclature and fortran format
information.

| Flag | Information | Contents of Track |
|------|-------------|-------------------|
| 1 | Drilling parameters | DATE/TIME/D/DBT/WB/XN/PS1/PS2/PS3 |
| 2 | Drilling Parameters | DELD/WH/TBOT/TOFB/CP/PP/GAS |
| 3 | Bit Parameters | DIN/IBRUN/XJ1/XJ2/XJ3/TW/BW/BW/MT |

| | | |
|---|---|---|
| 4 | Pump Parameters | PEFF/PUD(1)/PUL1(1)/PUD(2)/PUL1(2)/PUD(3)/PUL1(3)/PTYP |
| 5 | Well Parameters | REGION/RIG/WELL |
| 6 | Mud Parameters | DEPMM/RHOF/FV/IFVIS/IYP/APIWB/PH/IGIN/ICHLO/ICA/WLAPTP/VAP/PM/PF/XI |
| 7 | Mud Parameters | SAND/SOLID/OIL/MTYP |

--- NOMENCLATURE ---

| Symbol | Description | Form. |
|---|---|---|
| DATE | Date | 3A3 |
| TIME | Time | 3A3 |
| D | Vertical Depth (ft) | F5.0 |
| DBT | Bit Location (ft) | F6.0 |
| WB | Weight on Bit (klb) | F7.2 |
| XN | Rotary Speed (rpm) | F7.2 |
| PS1 | Strokes Pump # 1 | F6.0 |
| PS2 | Strokes Pump # 2 | F6.0 |
| PS3 | Strokes Pump # 3 | F6.0 |
| DELD | Depth Drilled (ft) | F9.2 |
| WH | Hook Load (klb) | F6.1 |
| TBOT | Rotating Time (hrs) | F6.2 |
| TOFB | Non-Rotating Time (hrs) | F6.2 |
| CP | Casing Pressure (psi) | F6.0 |
| PP | Pump Pressure (psi) | F6.0 |
| GAS | Gas % | F2.1 |
| DIN | Bit Insertion Depth (ft) | |
| IBRUN | Bit Run # | I4 |
| DIAM | Bit Diameter (in.) | F6.2 |
| BTYP | Bit type | 2A4 |
| XJ1 | Jet Nozzle Size (in.) | F4.0 |
| XJ2 | Jet Nozzle Size (in.) | F4.0 |
| XJ3 | Jet Nozzle Size (in.) | F4.0 |
| TW | Tooth Wear | F4.0 |
| BW | Bearing Wear | F4.0 |
| GW | Gauge Wear | F4.0 |
| MTYP | Mud Type | I2 |
| PEFF | Pump Effeciency | F7.0 |
| PUD(1) | Liner Diameter Pump # 1 (in.) | F6.3 |
| PUL(1) | Liner Length Pump # 1 (in.) | F7.3 |
| PUD(2) | Liner Diameter Pump # 2 (in.) | F6.3 |
| PUL(2) | Liner Length Pump # 2 (in.) | F7.3 |
| PUD(3) | Liner Diameter Pump # 3 (in.) | F6.3 |
| PUL(3) | Liner Length Pump # 3 (in.) | F7.3 |
| PTYP | Pump Type | F3.0 |
| REGION | Well Region | 2A3 |
| RIG | Rig ID | 2A3 |
| WELL | Well ID | 3A4 |
| DEPMM | Depth @ Mud Measurement (ft) | F6.0 |
| RHOF | Mud Density (at pump) (ppg) | F5.2 |
| FV | Plastic Viscosity (cp) | F5.1 |
| IFVIS | Funnel Viscosity (cp) | I3 |
| IYP | Yield Point (lb/100ft) | I3 |
| APIWB | Water Loss API | F5.1 |
| PH | Mud pH | F4.1 |
| IGIN | Gel Initial | I3 |
| IGFIN | Gel Final | I3 |
| ICHLO | Chlorites % | I6 |
| ICA | Calcium+ % | I5 |
| WLHPTP | Water Loss HPTP | F5.1 |
| VAP | Apparent Viscosity (cp) | F5.1 |
| PM | | F4.1 |
| PF | | F4.1 |

| | | | | F4.1 |
|---|---|---|---|---|
| XMF | | | | F4.1 |
| SAND | | Mud Sand Contents % | | F4.1 |
| SOLID | | Total Solids % | | F4.1 |
| OIL | | Oil % | | F4.1 |
| MTYP | | Mud Type | | I2 |

FILE DRLDAT2   Data Organization

| Record No. | Variable Name | Units | Description |
|---|---|---|---|
| 1 | NS | | # of sections in well |
| 2 - 41 | DI | in. | pipe ID |
| 2 - 41 | D1 | in. | annulus ID |
| 2 - 41 | D2 | in. | annulus OD |
| 2 - 41 | SL | ft | section length |
| 42 | Q | gpm | mud flowrate (at pumps) |
| 43 | DS | in. | cutting diam. |
| 44 | DB | in. | bit diam. |
| 45 | ROPE | ft/hr | estim. pen. rate |
| 46 | PP | psia | pump pressure |
| 47 | CP | psia | casing pressure |
| 48 | IR | -- | rheological model flag |
| 49 | PV | cp | plastic viscosity |
| 50 | YP | lb/100ft | yield point |
| 51 | RK | | consistency index |
| 52 | RN | | flow behavior index |
| 53 | RHOS | ppg | cuttings density |
| 54 | RHOF | ppg | mud density |
| 55 | ECD | ppg | equivalent circ. density |
| 56 | HPB | HP | bit horsepower |
| 57 | DBT | ft | bit location |
| 58 | DT | ft | total depth of well |
| 59 | NP | -- | pipe condition flag |
| 60 | XN | rpm | rotary speed |
| 61 | WB | klb | weight on bit |
| 62 | TOB | hrs | time on bottom |
| 63 | TOFB | hrs | time off bottom |
| 64 | DIN | ft | depth bit inserted |
| 65 | IBRUN | -- | bit run No. |
| 66 - 68 | XJi | in/16 | jet nozzle size |
| 69 | TW | -- | tooth wear |
| 70 | BW | -- | bearing wear |
| 71 | GW | -- | gauge wear |
| 72 | MTYP | -- | mud type |
| 73 | PEFF | -- | pump efficiency |
| 74 - 79 | PUDi | in. | pump diameter |
| 74 - 79 | PULi | in. | pump length |
| 80 | PTYP | -- | pump type |
| 81 | REGION | -- | well location |
| 82 | RIG | -- | well location |
| 83 | WELL | -- | well location |
| 84 | DEPMM | ft | dep. @ mud measurement |
| 85 | IFVIS | cp | fan viscosity |
| 86 | APIWB | | API water loss |
| 87 | PH | -- | mud pH |
| 88 | IGIN | | gel strength into well |
| 89 | IGFIN | | final gel strength |
| 90 | ICHLO | | chlorides in mud |
| 91 | ICAT | | calcium in mud |
| 92 | WLAPTP | | APTP water loss |
| 93 | VAP | | AP viscosity |
| 94 | PM | | |
| 95 | PF | | |

FILE DRLDAT2   Data Organization
(continued)

| Record No. | Variable Name | Units | Description |
|---|---|---|---|
| 96 | XMF | | |
| 97 | SAND | | |
| 98 | SOLID | | |
| 99 | OIL | | |
| 100 – 102 | Ni | | bit model numbers |
| 103 | DAVG | ft | avg dep. present bit |
| 104 | GP | ppg | pore pressure gradient |
| 105 | FSMAX | -- | limit of model function |
| 106 | WBT | klb | treshhold bit wt. |
| 107 – 113 | Ai | -- | model parameters |
| 114 | CB | $ | bit cost |
| 115 | CR | $/day | rig cost |
| 116 | TT | hrs | trip time |
| 117 | TCM | min | connection time |
| 118 | SL | ft | stand length |
| 119 | OTB | hrs | offset bit life |
| 120 | OXW | klb | offset bit WOB |
| 121 | OXN | rpm | offset bit rot. speed |
| 122 | ODB | in. | offset bit diam. |
| 123 | OHF | -- | offset bit tooth wear |
| 124 | OBF | -- | offset bit bearing wear |
| 125 – 127 | ONi | | offset bit model numbers |
| 128 | ODAVG | ft | avg. dep. offset bit |
| 129 | OECD | ppg | avg. eq. cir. den. offs. bit |
| 130 | OGP | ppg | avg. pore pres. grad offs bit |
| 131 | OHPB | HP | offset bit horsepower |
| 132 | OWBT | klb | offs. bit treshhold bit wt. |
| 133 | OFSMX | | offs. bit lim. of model fnc. |
| 134 – 140 | Ai | -- | offs. bit model parameters |

We claim:

1. A real-time method for controlling a drilling process to achieve an optimum economic utilization of a drill bit in a borehole on a realtime basis for a drilling operation in progress by determining when the drill bit is to be replaced comprising the steps of:

(a) acquiring values of a plurality of real-time drilling operating variables and an actual penetration rate for the drill bit from sensors;

(b) storing the plurality of acquired values of realtime drilling operating variables and the actual penetration rate;

(c) calculating at predetermined intervals, a plurality of values of real-time parameters of a real-time, multivariate, predictive, penetration rate model having real-time operating variables associated with the drilling process, each parameter associated with one of the real-time drilling operating variables of the model wherein the parameters measure the sensitivity of the penetration rate of the drill bit in the borehole to each of the operating variables of the model;

(d) calculating at predetermined intervals, real-time expressions of the penetration rate of the drill bit in the borehole using the real-time operating variables in the model and the calculated values of the real-time parameters;

(e) calculating a total, expected controllable unit cost over a future drilling interval of depth for the drill bit currently in the borehole using a predictive penetration rate expression;

(f) calculating a total, expected controllable unit cost over said future drilling interval of depth for a replacement bit by utilizing a predictive penetration rate expression containing values of variables, parameters, and coefficients corresponding to the replacement bit;

(g) comparing the total, expected controllable unit cost of the drill bit currently in the borehole and the total, expected controllable unit cost of the replacement drill bit over said future drilling interval of depth and identifying the drill bit that is expected to generate lower cost over the future drilling interval of depth; and (h) replacing the drill bit in the borehole when the unit cost calculated in step (e) exceeds the unit cost calculated in step (f) at the future drilling interval depth.

2. The method of claim 1 and further including the step of:
displaying the expected costs of both the drill bit currently in the borehole and the replacement drill bit.

3. The method of claim 1 wherein the step of calculating a total, expected controllable unit cost expression for the replacement drill bit is based on a replacement drill bit of the same type as the drill bit currently in the borehole.

4. The method of claim 1 wherein the step of calculating a total, expected controllable unit cost expression for the replacement drill bit is based on a replacement drill bit having performance characteristics similar to the drill bit currently in the borehole.

5. The method of claim 1 wherein the step of calculating a total, expected controllable unit cost expression for the replacement drill bit is based on a partially worn replacement drill bit.

6. The method of claim 1 and further including the step of:
   prorating tripping costs for a replacement drill bit over the future interval of depth.

7. The method of claim 1 and further including the step of:
   estimating the likely penetration rate pattern of a replacement drill bit over the future drilling interval of depth by incorporating selected values of variables, parameters, and coefficients acquired and calculated from prior bit runs in the borehole being drilled.

8. The method of claim 7 and further including the step of:
   compriaing the total, expected controllable unit costs for both the drill bit currently in the borehole and the replacement drill bit based on a simulation of a real-time penetration rate expeession utilizing variables, parameters or model coefficients from bit runs in wells other than the well being drilled.

9. The method of claim 7 and further including the step of:
   incorporating variable and parameter values in a real-time, expected penetration rate expression for a replacement drill bit based on values generated and input by drilling personnel.

10. The method of claim 9 and further including the step of:
    comparing a total, expected controllable unit cost for the current drill bit and for a replacement drill bit over a future expected interval that can be drilled by the drill bit currently in the borehole.

11. The method of claim 10 and further including the step of:
    comparing the total, expected controllable unit cost for the drill bit currently in the borehole and a replacement drill bit of a different type or with different performance characteristics by utilizing a predictive penetration rate expression for said replacement drill bit incorporating variables, parameters, and coefficients acquired from intervals drilled with the different type of replacement drill bit under consideration.

* * * * *

UNITED STATES PATENT AND TRADEMARK OFFICE
CERTIFICATE OF CORRECTION

PATENT NO. : 4,794,535

DATED : December 27, 1988

INVENTOR(S) : Richard L. Gray et al.

It is certified that error appears in the above-identified patent and that said Letters Patent is hereby corrected as shown below:

Column 81, Claim 8, line 22, change "compriaing" to --comparing--.

Column 81, Claim 8, line 25, change "expession" to --expression--.

Signed and Sealed this

Third Day of October, 1989

Attest:

DONALD J. QUIGG

Attesting Officer

Commissioner of Patents and Trademarks